(12) United States Patent
Naito

(10) Patent No.: US 11,700,305 B2
(45) Date of Patent: *Jul. 11, 2023

(54) MOVING SENSOR MANAGEMENT UNIT, MOVING SENSOR APPARATUS, MATCHING APPARATUS, SENSING DATA DISTRIBUTION SYSTEM, DATA PROVISION METHOD, AND DATA PROVISION PROGRAM

(71) Applicant: OMRON Corporation, Kyoto (JP)

(72) Inventor: Takeshi Naito, Tokyo (JP)

(73) Assignee: OMRON Corporation, Kyoto (JP)

( * ) Notice: Subject to any disclaimer, the term of this patent is extended or adjusted under 35 U.S.C. 154(b) by 222 days.

This patent is subject to a terminal disclaimer.

(21) Appl. No.: 16/642,055

(22) PCT Filed: Jul. 18, 2018

(86) PCT No.: PCT/JP2018/026810
§ 371 (c)(1),
(2) Date: Feb. 26, 2020

(87) PCT Pub. No.: WO2019/058726
PCT Pub. Date: Mar. 28, 2019

(65) Prior Publication Data
US 2021/0075858 A1    Mar. 11, 2021

(30) Foreign Application Priority Data
Sep. 19, 2017 (JP) ................................. 2017-178471

(51) Int. Cl.
*H04L 67/12* (2022.01)
*H04Q 9/00* (2006.01)
(52) U.S. Cl.
CPC ............. *H04L 67/12* (2013.01); *H04Q 9/00* (2013.01)

(58) Field of Classification Search
CPC .......... H04L 67/12; H04Q 9/00; H04W 4/50; H04W 4/38; G08G 1/00; G06Q 50/10; H04M 11/00
See application file for complete search history.

(56) References Cited

U.S. PATENT DOCUMENTS 6,510,403 B1    1/2003  Ghaseminejad
2004/0249590 A1*  12/2004  Ota .................... G01D 9/005
702/79

(Continued)

FOREIGN PATENT DOCUMENTS

EP     2743883 A1   6/2014
JP     5445722 B1   3/2014

(Continued)

OTHER PUBLICATIONS

English translation of the International Search Report ("ISR") of PCT/JP2018/026810 dated Sep. 4, 2018.

(Continued)

*Primary Examiner* — Eyob Hagos
(74) *Attorney, Agent, or Firm* — Metrolex IP Law Group, PLLC

(57) ABSTRACT

A moving sensor management unit is configured to provide, to a user, sensing data generated by a sensing device attached to a mobile object, and includes a run operation information storage unit configured to store run operation information of the mobile object, a run operation information update unit configured to, when a request to change the run operation information is received, update the run operation information stored in the run operation information storage unit, in accordance with the change request, and a first output control unit configured to output, in response to a provision request to provide sensing data that is based on (Continued)

the run operation information, sensing data corresponding to the provision request, to the user.

12 Claims, 12 Drawing Sheets

(56) References Cited

U.S. PATENT DOCUMENTS

| | | | |
|---|---|---|---|
| 2009/0092284 A1* | 4/2009 | Breed | G01S 7/4802 |
| | | | 382/103 |
| 2014/0214726 A1 | 7/2014 | Minato et al. | |
| 2014/0372561 A1 | 12/2014 | Hisano | |
| 2015/0065107 A1 | 3/2015 | Dave et al. | |
| 2016/0210862 A1* | 7/2016 | Hisano | G08G 1/0145 |
| 2016/0325680 A1 | 11/2016 | Curtis et al. | |
| 2017/0010618 A1* | 1/2017 | Shashua | G08G 1/167 |
| 2017/0313332 A1* | 11/2017 | Paget | B61L 25/021 |
| 2018/0281794 A1* | 10/2018 | Ravichandran | B60K 35/00 |
| 2018/0373956 A1 | 12/2018 | Yamato | |
| 2019/0019423 A1* | 1/2019 | Choi | G08G 5/045 |
| 2019/0087875 A1* | 3/2019 | Morioka | G01C 21/3438 |
| 2019/0121348 A1* | 4/2019 | Celia | G06N 3/084 |
| 2019/0174207 A1* | 6/2019 | Celia | H04Q 9/00 |

FOREIGN PATENT DOCUMENTS

| | | |
|---|---|---|
| JP | 2017-111501 A | 6/2017 |
| JP | 6142505 B2 | 6/2017 |
| WO | 01/35365 A1 | 5/2001 |
| WO | WO-0135365 A1 * | 5/2001 ............. G08B 31/00 |

OTHER PUBLICATIONS

Written Opinion ("WO") of PCT/JP2018/026810 dated Sep. 4, 2018.

Japanese Office Action ("JPOA") dated Sep. 4, 2018 in a counterpart Japanese Patent application.

Extended European Search Report (EESR) dated May 19, 2021 in a counterpart European Patent application.

* cited by examiner (A)

(B)

MOVING SENSOR MANAGEMENT UNIT, MOVING SENSOR APPARATUS, MATCHING APPARATUS, SENSING DATA DISTRIBUTION SYSTEM, DATA PROVISION METHOD, AND DATA PROVISION PROGRAM

TECHNICAL FIELD

The present invention relates to a technique for distributing sensing data between a provider and a user.

RELATED ART

Conventionally, there are sensor network systems for distributing sensing data obtained by a sensor, between a provider and a user (for example, see Patent Document 1). The provider registers, in a network server, sensor-side metadata regarding a sensor and sensing data that is obtained and provided by this sensor. In addition, the user registers, in the network server, application-side metadata regarding an application in which sensing data is used and sensing data that is used in this application. The sensor-side metadata is information regarding attributes of a sensor and sensing data that is obtained by the sensor. The application-side metadata is information regarding attributes of an application itself and sensing data required for the application.

The network server matches sensor-side metadata with application-side metadata, and extracts a sensor (on the provider side) capable of providing sensing data that meets a request of an application (on the user side). The network server transmits a data flow control instruction to the extracted sensor (on the provider side). This data flow control instruction is an instruction instructing that sensing data be distributed from the provider to the user.

RELATED ART DOCUMENTS

Patent Documents

Patent Document 1: Japanese Patent No. JP 5445722

SUMMARY OF THE INVENTION

Problem to be Solved by the Invention

However, the provider installs a sensor in order to obtain necessary sensing data for themselves. If there is a user that desires to use the obtained sensing data, the provider provides the sensing data to the user. In other words, the provider did not install the sensor in order to provide sensing data to the user. Therefore, in sensor network systems described in Patent Document 1 and the like, in the absence of a provider that has installed a sensor that can obtain sensing data required by a user, the user cannot receive the necessary sensing data.

For example, if sensing data required by a user is sensing data of a traffic situation at a certain intersection, and if there is no provider that has installed a sensor that senses a traffic situation at this intersection, sensing data regarding a traffic situation at this intersection cannot be provided to the user. Known examples of a sensor that senses a traffic situation at an intersection include an image sensor that captures an image of the intersection and a vehicle detection sensor that detects a vehicle running through the intersection (e.g., a loop coil sensor, an ultrasonic wave sensor, and a photo-electronic sensor).

There is a desire to reduce a frequency at which a situation occurs in which a user cannot receive necessary sensing data, in order to promote utilization of sensing data using a sensor network system.

It is an object of the present invention to provide a technique that makes it possible to suppress a frequency at which a situation occurs in which a user of sensing data cannot receive necessary sensing data, and promote utilization of sensing data.

Means for Solving the Problems

A moving sensor management unit of the present invention is configured as follows in order to achieve the above-mentioned object. First, the moving sensor management unit is configured to provide, to a user, sensing data generated by a sensing device attached to a mobile object.

A run operation information storage unit stores run operation information of the mobile object to which a sensing device that senses an observed characteristic of an observation target is attached. The mobile object is an object provided with a motive power unit for moving the main body thereof, and is a drone, a self-driving vehicle, or a helicopter, for example. In addition, the sensing device includes one or more sensors that sense an observed characteristic of an observation target, and is a device that outputs a sensing signal of a sensor that sensed an observed characteristic. The observation target is an abstract entity of a phenomenon in the real world (a human, an object, an event, etc.) In addition, the observed characteristic is a characteristic of an observation target that is observed using an actual sensor. Examples of the observation target include an adult human, a household, and an automobile. Examples of an observed characteristic of an adult human include systolic blood pressure, diastolic blood pressure, and a heartbeat. Examples of an observed characteristic of a household include power usage, gas usage and water usage. Examples of an observed characteristic of a vehicle include a position, a speed, and a fuel consumption rate (fuel consumption).

When a change request to change the run operation information is received, a run operation information update unit updates the run operation information stored in the run operation information storage unit, in accordance with the change request. In response to a provision request to provide sensing data that is based on the run operation information, a first output control unit outputs sensing data corresponding to the provision request, to the user.

In this configuration, the sensing device is attached to the mobile object, and the run operation information of this mobile object can be updated by the run operation information update unit. Therefore, even if there is no sensor installed at a position at which sensing data required by the user can be obtained, the sensing device can be moved to a position at which sensing data required by the user can be obtained, by updating the run operation information of the mobile object. Accordingly, if there is no provider that has installed a sensor that can obtain sensing data required by the user, sensing data can be provided to this user. Therefore, a frequency at which a situation occurs in which a user of sensing data cannot receive necessary sensing data is reduced, and utilization of sensing data is promoted.

In addition, it is preferred to include a second output control unit that outputs, when the run operation information is updated by the run operation information update unit according to a run operation change request, the updated run operation information to a run operation manager that manages a run operation of the mobile object. With such a configuration, the run operation manager that manages a run operation of the mobile object can quickly run the mobile object according to the updated run operation information.

In addition, a configuration may also be adopted in which a sensing data storage unit that stores sensing data is further included, and when a provision request is received, and sensing data corresponding to the provision request is stored in the sensing data storage unit, the first output control unit outputs the sensing data stored in the sensing data storage unit to the user, and, when the provision request is received, and sensing data corresponding to the provision request is not stored in the sensing data storage unit, outputs, to the user, sensing data after it is generated by the sensing device.

With such a configuration, a time required for providing sensing data to the user is not unnecessarily long.

In addition, the sensing data storage unit preferably stores a position at which the sensing device generated the sensing data, a time when the sensing device generated the sensing data, and the sensing data generated by the sensing device, in association with each other. Accordingly, it is possible to appropriately manage sensing data obtained by the sensing device sensing an observed characteristic of an observation target.

In addition, a configuration may also be adopted in which an attribute information storage unit configured to store device attribute information indicating an attribute of the sensing device and mobile object attribute information indicating an attribute of the mobile object, and a third output control unit configured to output a provision data catalogue that indicates attributes of sensing data that can be provided to the user by the moving sensor management unit, and that is generated based on the run operation information, the device attribute information, and the mobile object attribute information are further included. With such a configuration, it is possible to accurately determine whether or not sensing data required by the user can be provided.

A moving sensor apparatus may include the moving sensor management unit and sensing device, which have been described above. The moving sensor apparatus may also have a configuration in which the moving sensor management unit and sensing device are formed integrally, or a configuration in which the moving sensor management unit and sensing device are not formed integrally. If the moving sensor management unit and the sensing device are integrally formed, the moving sensor apparatus is preferably attached to a mobile object.

In addition, using a matching apparatus configured to include:

a first determination unit configured to determine whether or not the moving sensor apparatus can provide sensing data having an attribute requested by a user without changing the run operation information, a second determination unit configured to determine whether or not the moving sensor apparatus can provide sensing data having an attribute requested by a user, by changing the run operation information, and a run operation change request unit configured to output a change request to the moving sensor apparatus if the first determination unit determines that the moving sensor apparatus cannot provide sensing data having an attribute requested by the user without changing the run operation information, and the second determination unit determines that the moving sensor apparatus can provide sensing data having an attribute requested by the user by changing the run operation information, it is possible to prevent the run operation information of the mobile object from being updated unnecessarily.

Furthermore, a sensing data distribution system may be built using the moving sensor apparatus and matching apparatus, which have been described above.

Effects of the Invention

According to the present invention, a frequency at which a situation occurs in which a user of sensing data cannot receive necessary sensing data is reduced, and utilization of sensing data is promoted.

EMBODIMENTS OF THE INVENTION

An embodiment of the present invention will be described below.

Figure 1:
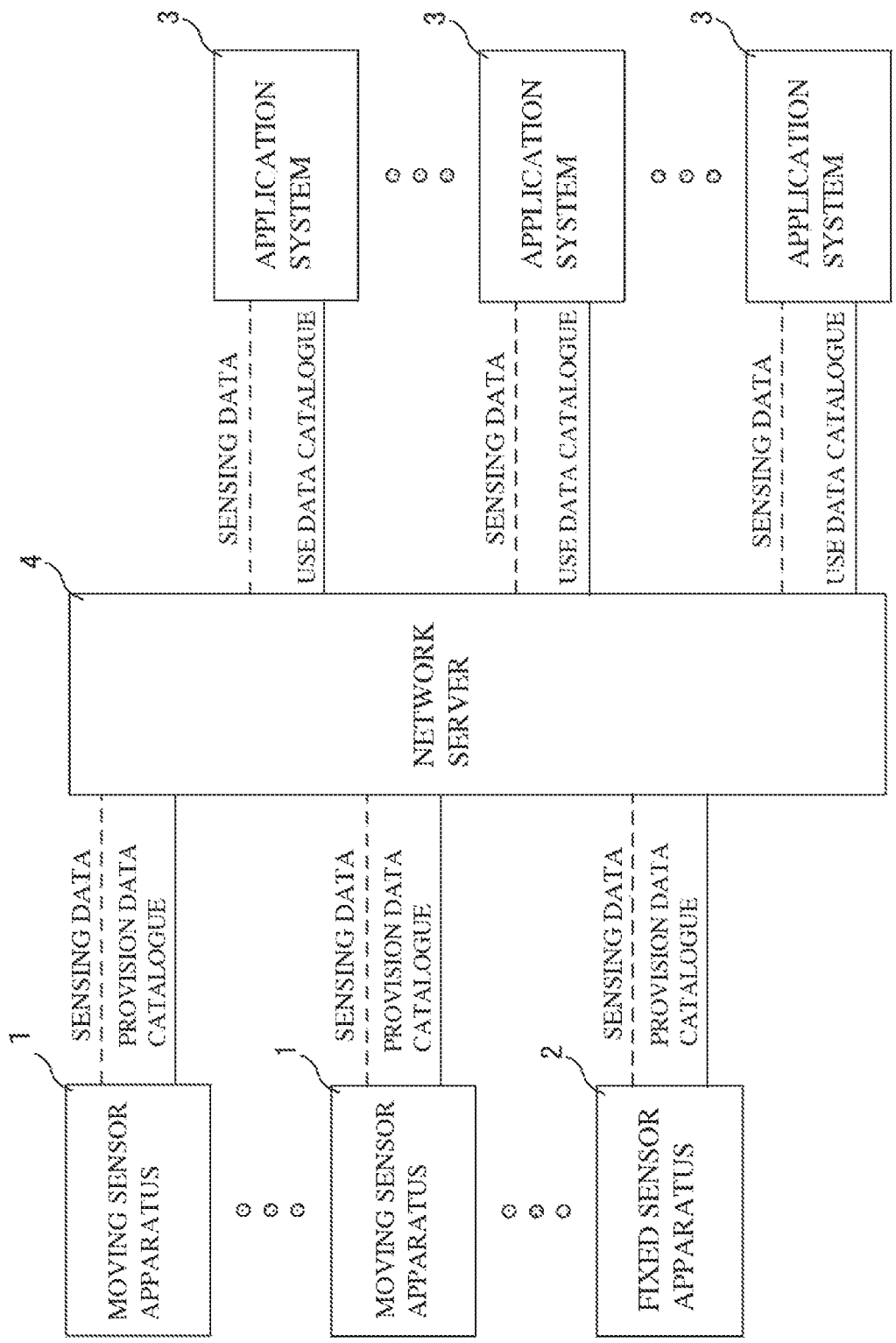
FIG. 1 is a schematic diagram illustrating a sensing data distribution system.

FIG. 1 is a schematic diagram illustrating a sensing data distribution system according to an example of the present invention. This sensing data distribution system includes moving sensor apparatuses 1, one or more fixed sensor apparatuses 2, application systems 3, and a network server 4. The moving sensor apparatuses 1, the fixed sensor apparatus 2, and the application systems 3 are connected to the network server 4 via a network (not illustrated) to enable data communication. A plurality of moving sensor apparatuses 1, fixed sensor apparatuses 2, and application systems 3 can be connected to the network server 4.

The moving sensor apparatuses 1 and the fixed sensor apparatus 2 are each configured as a provider that provides sensing data to a user, in the sensing data distribution system in this example. In addition, the application systems 3 are each configured as a user that uses sensing data provided from a provider, in the sensing data distribution system in this example. The network server 4 has a configuration for realizing a sensing data distribution market that is a market place on the Internet for trading sensing data using the sensing data distribution system in this example, namely a sensing data trading market (SDTM).

The moving sensor apparatuses 1 and the fixed sensor apparatus 2 that provide sensing data register, in the network server 4, provision data catalogues indicating attributes of sensing data to be traded (sold) in the SDTM. In addition, the application systems 3 that use sensing data register, in the network server 4, use data catalogues indicating attributes of sensing data to be traded (purchased) in the SDTM. The network server 4 compares the provision data catalogues and the use data catalogues, and performs matching processing for extracting a provider-side apparatus (a moving sensor apparatus 1 or the fixed sensor apparatus 2) that can provide sensing data required by an application system 3. In addition, the network server 4 performs data flow control processing for instructing the provider-side apparatus extracted through the matching processing to provide sensing data to the user. When the instruction is given to provide sensing data to the user, the provider-side apparatus transmits the sensing data to the application system 3 that is the user-side apparatus. The application system 3 executes an application program in which the provided sensing data (sensing data transmitted from the provider-side apparatus) is used as input. The user of the sensing data utilizes the processing result of the application program.

Note that, in this example, the moving sensor apparatuses 1 register moving sensor provision data catalogues 100 to be described later as the above-described provision data catalogues, in the network server 4, and the fixed sensor apparatus 2 registers, in the network server 4, a fixed sensor provision data catalogue 101 to be described later as the above-described provision data catalogue. In addition, in the following description, if the moving sensor provision data catalogues 100 and the fixed sensor provision data catalogue 101 are not distinguished from each other, they may be simply referred to as "provision data catalogues". In addition, a provider-side apparatus may transmit sensing data to an application system 3 via the network server 4, or may also transmit sensing data to an application system 3 without intervention of the network server 4.

Figure 2:
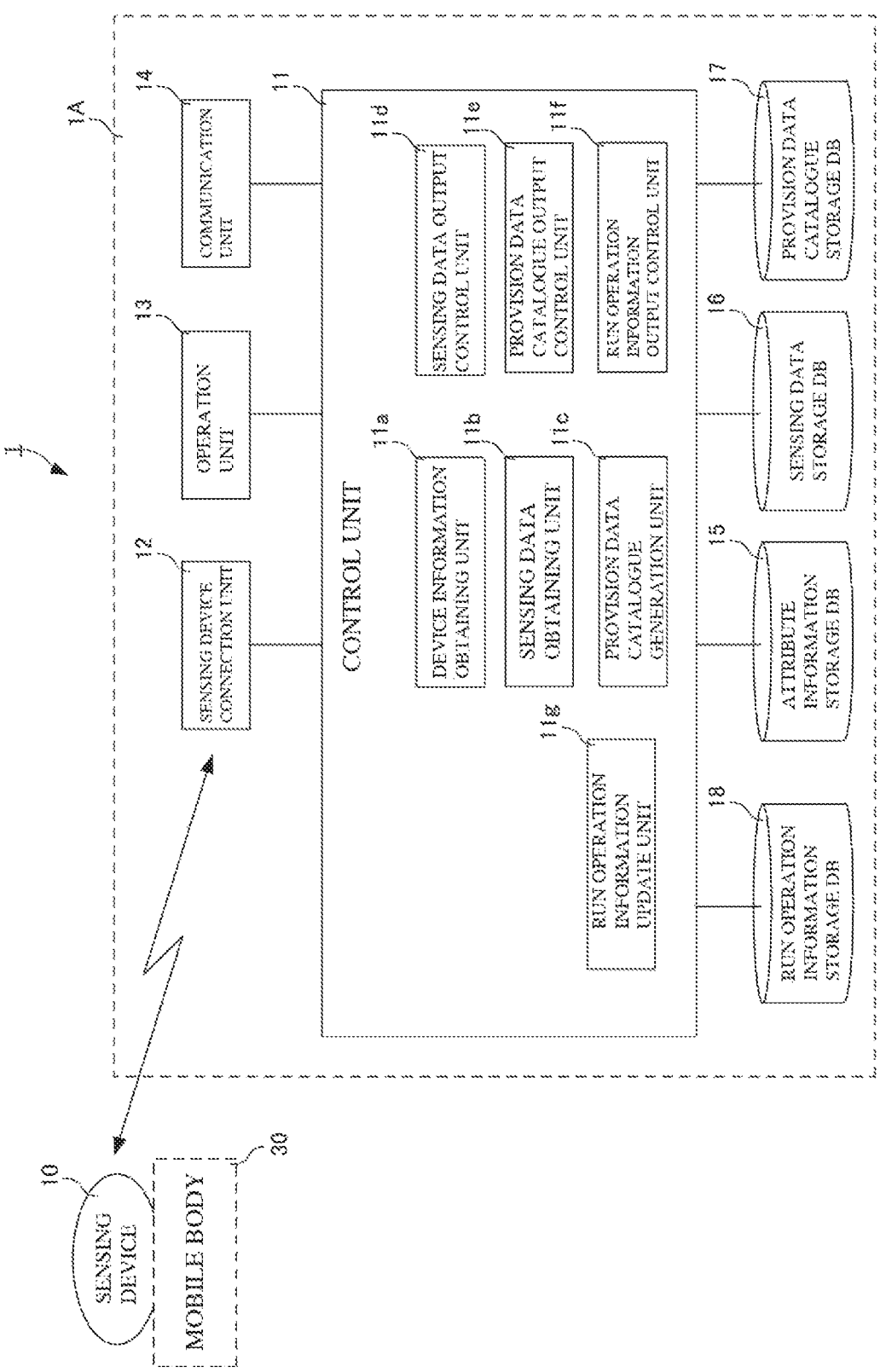
FIG. 2 is a block diagram illustrating a configuration of main constituent elements of a moving sensor apparatus according to an example of the present invention.

FIG. 2 is a block diagram illustrating a configuration of main constituent elements of a moving sensor apparatus according to this example. The moving sensor apparatus 1 according to this example includes a moving sensor management unit 1A and a sensing device 10 that is attached to a mobile object 30. The moving sensor apparatus 1 may also be an apparatus in which the moving sensor management unit 1A and the sensing device 10 are integrally formed, or may also be an apparatus in which the moving sensor management unit 1A and the sensing device 10 are not integrally formed. If the moving sensor management unit 1A and the sensing device 10 are integrally formed, then the moving sensor apparatus 1 is attached to the mobile object 30. If the moving sensor management unit 1A and the sensing device 10 are not integrally formed, then the moving sensor apparatus 1 may have a configuration in which the moving sensor management unit 1A and the sensing device 10 are attached to the mobile object 30, or a configuration in which the sensing device 10 is attached to the mobile object 30, and the moving sensor management unit 1A is installed in a location that is not in the mobile object 30.

The sensing device 10 is a device that includes one or more sensors that sense an observed characteristic of an observation target, and outputs a sensing signal of a sensor that has sensed an observed characteristic. The sensing device 10 of the moving sensor apparatus 1 is not a device of a specific type, and is a device of a type selected by the manager of the moving sensor apparatus 1 as necessary. Therefore, if two moving sensor apparatuses 1 connected to the network server 4 are extracted, the two extracted moving sensor apparatuses 1 may have sensing devices 10 of the same type or different types. The mobile object 30 is not particularly limited as long as the mobile object 30 is an object provided with a motive power unit for moving the main body thereof. Examples of the mobile object 30 include drones, self-driving vehicles, self-driving vessels, and helicopters. Accordingly, the mobile object 30 may be a flying object that can fly, a vehicle that runs on ground, a vessel that runs over the sea, or a mobile object that runs in any other place (for example, a robot that runs underground or the like).

The moving sensor management unit 1A includes a control unit 11, a sensing device connection unit 12, an operation unit 13, a communication unit 14, an attribute information storage database 15 (attribute information storage DB 15), a sensing data storage database 16 (sensing data storage DB 16), a provision data catalogue storage database 17 (provision data catalogue storage DB 17), and a run operation information storage database 18 (run operation information storage DB 18).

The control unit 11 controls operations of the main body of the moving sensor management unit 1A. As shown in FIG. 2, the control unit 11 includes a device information obtaining unit 11a, a sensing data obtaining unit 11b, a provision data catalogue generation unit 11c, a sensing data output control unit 11d, a provision data catalogue output control unit 11e, a run operation information output control unit 11f, and a run operation information update unit 11g. The device information obtaining unit 11a, the sensing data obtaining unit 11b, the provision data catalogue generation unit 11c, the sensing data output control unit 11d, the provision data catalogue output control unit 11e, the run operation information output control unit 11f, and the run operation information update unit 11g of the control unit 11 will be described later in detail.

The sensing device connection unit 12 has a configuration for connecting itself to the sensing device 10, and operates as an interface that controls input/output of data from/to the sensing device 10. It suffices for the sensing device connection unit 12 to have a configuration that enables at least one of wired connection and wireless connection to the sensing device 10. However, in the case of a moving sensor apparatus 1 that is used in a form in which the moving sensor management unit 1A is not attached to the mobile object 30 (a moving sensor apparatus 1 in which the moving sensor management unit 1A and the sensing device 10 are not integrally formed), the sensing device connection unit 12 have a configuration that enables at least wireless connection to the sensing device 10.

The operation unit 13 receives an operator's input operation on the main body of the moving sensor apparatus 1 (the moving sensor management unit 1A). The operation unit 13 may be configured to include a display and a touch panel attached to the screen of this display, or may also be configured to include an input operation device such as a keyboard or a mouse. The operation unit 13 has a configuration for controlling screen display on the display (configuration related to a user interface).

The communication unit 14 performs data communication with an external apparatus such as the network server 4, an application system 3, and a run operation management apparatus (not illustrated) that manages run operations of the mobile object 30, via a network. The communication unit 14 may also have a configuration related to the above-described sensing device connection unit 12.

The attribute information storage DB 15 stores device attribute information indicating the attributes of the sensing device 10 and mobile object attribute information indicating the attributes of the mobile object 30. The attribute information storage DB 15 corresponds to an attribute information storage unit in the context of the present invention. The device attribute information is information regarding the attributes of the sensing device 10 and sensing data obtained by the sensing device 10. For example, the device attribute information includes information indicating a sensor name, a sensor type, a resolution, detection accuracy, and the like, for each sensor of the sensing device 10.

In addition, the mobile object attribute information includes type information of the mobile object 30 ("drone", "self-driving vehicle", "helicopter", etc.), the maximum speed of the mobile object 30, and run operation permission information regarding how the mobile object 30 is permitted to run. The type information of the mobile object 30 is information indicating a type such as "drone", "self-driving vehicle", or "helicopter". The run operation permission information is information indicating a period during which the mobile object 30 is permitted to run (run operation permission period), a region in which the mobile object is permitted to run (run operation permission region), and the like. For example, the run operation permission period may be defined in a format of a date (e.g., the period from Sep. 1, 2017 to Sep. 30, 2017), may also be defined in a format of a date and a time period (e.g., the period from Sep. 1, 2017 to Sep. 30, 2017 and the time period from 9:00 am to 5:00 pm), may also be defined in a format of a date and a climate condition (e.g., the period from Sep. 1, 2017 to Sep. 30, 2017 and the time period from sun rise to sun down), or may also be defined in a format of an item other than those descried above. In addition, the run operation permission region may be defined as a region with a radius of n Km centered on a point specified, for example, by a latitude and a longitude, may also be defined as a rectangular region surrounded by four points specified by latitudes and longitudes, may also be defined as an area name, or the like, or may also be defined as an item other than those descried above. In addition, if the mobile object 30 is a flying object, the mobile object attribute information may include information in which the altitude thereof is defined.

The sensing data storage DB 16 stores a sensing position (the position of the mobile object 30), a sensing time, and sensing data in association, for each observed characteristic of an observation target sensed by the sensing device 10. Specifically, the sensing data storage DB 16 stores a position at which the sensing device 10 generated sensing data, a time when the sensing device 10 generated sensing data, and sensing data generated by the sensing device 10, in association. The sensing data storage DB 16 corresponds to a sensing data storage unit in the context of the present invention. In addition, the sensing data storage DB 16 may also be configured to store dynamic metadata and processed metadata. The dynamic metadata is data indicating attributes of items related to the attributes of a sensor and sensing data, and change according to the way the sensor is used. The dynamic metadata is data indicating the attributes of items related to installation of a sensor such as an installation angle, a distance to an observation target, a setting measurement range, a resolution of a setting measurement area, and a setting sampling frequency, as well as items related to operation parameters set in the sensor, and the like. This dynamic metadata is data that can change over time. Accordingly, in order to obtain an appropriate dynamic parameter at a certain time point, it is necessary to generate a dynamic parameter at the time point.

In addition, the processed metadata is information regarding a feature amount that is obtained by processing sensing data. The processed metadata is data related to feature amounts of sensing data that change in real time, such as processing for labeling sensing data, a change amount, and a vector value. Therefore, processed metadata is data that changes over time.

The provision data catalogue storage DB 17 stores moving sensor provision data catalogues 100. A moving sensor provision data catalogue 100 will be described later in detail. If a moving sensor provision data catalogue 100 is not registered in the network server 4, the moving sensor apparatus 1 cannot trade (sell), in the SDTM, sensing data of this moving sensor provision data catalogue 100 even if this moving sensor provision data catalogue 100 is stored in the provision data catalogue storage DB 17. In other words, the moving sensor apparatus 1 can only trade, in the SDTM, sensing data of a moving sensor provision data catalogue 100 registered in the network server 4.

The run operation information storage DB 18 stores run operation information of the mobile object 30. This run operation information is information indicating a travelling path on which the mobile object 30 is scheduled to travel, and is information constituted by table data in which a time and date and the position of the mobile object 30 at the time and date are registered as a pair at appropriate time intervals (5 minute interval, 10 minute interval, etc.), for example. Accordingly, run operation information is information that makes it possible to specify the position of the mobile object 30 at any time and date and a travelling path of the mobile object 30, with respect to the mobile object 30 that is run. The run operation information storage DB 18 corresponds to a run operation information storage unit in the context of the present invention.

Next, the device information obtaining unit 11a, the sensing data obtaining unit 11b, the provision data catalogue generation unit 11c, the sensing data output control unit 11d, the provision data catalogue output control unit 11e, the run operation information output control unit 11f, and the run operation information update unit 11g of the control unit 11 will be described.

The device information obtaining unit 11a obtains device attribute information of the sensing device 10, and stores the obtained device attribute information in the attribute information storage DB 15. If a configuration is adopted in which the sensing device 10 connected to the sensing device connection unit 12 stores device information, the device information obtaining unit 11a obtains the device information from this sensing device 10. In addition, if a configuration is adopted in which the sensing device 10 connected to the sensing device connection unit 12 stores an address on the network such as a URL, in which device information is registered, the device information obtaining unit 11a obtains, from this sensing device 10, the address on the network in which the device information is registered, accesses the obtained address, and obtains the device information of the sensing device 10. In addition, a configuration may also be adopted in which the device information obtaining unit 11a obtains device information input through an input operation on the operation unit 13.

The sensing data obtaining unit 11b obtains sensing data obtained by the sensing device 10 connected to the sensing device connection unit 12 sensing an observed characteristic of an observation target. The sensing data obtaining unit 11b obtains the sensing time and the position of the mobile object 30 along with the sensing data, and stores them in association with each other in the sensing data storage DB 16.

The provision data catalogue generation unit 11c generates a moving sensor provision data catalogue 100 based on run operation information of the mobile object 30 stored in the run operation information storage DB 18, the mobile object attribute information and the device attribute information stored in the attribute information storage DB 15, and stores the generated moving sensor provision data catalogue 100 in the provision data catalogue storage DB 17.

The sensing data output control unit 11d reads out requested sensing data from the sensing data storage DB 16, and controls the communication unit 14 to output the sensing data that has been read out, to the user. The sensing data output control unit 11d corresponds to a first output control unit in the context of the present invention.

The provision data catalogue output control unit 11e reads out, from the provision data catalogue storage DB 17, the moving sensor provision data catalogue 100 selected to be registered in the network server 4 using the operation unit 13, and controls the communication unit 14 to output, to the user, the moving sensor provision data catalogue 100 that has been read out. The provision data catalogue output control unit 11e corresponds to a third output control unit in the context of the present invention.

The run operation information update unit 11g updates the run operation information of the mobile object 30 stored in the run operation information storage DB 18. Upon receiving a request to change the run operation information of the mobile object 30 transmitted from an external apparatus such as the network server 4 using the communication unit 14, the moving sensor apparatus 1 updates the run operation information of the mobile object 30 stored in the run operation information storage DB 18 according to the change request received by the run operation information update unit 11g. The request to change the run operation information of the mobile object 30 is a run operation change request for requesting that the run operation of the mobile object 30 be changed.

When the run operation information of the mobile object 30 stored in the run operation information storage DB 18 is updated by the run operation information update unit 11g, the run operation information output control unit 11f notifies a run operation manager that manages run operations of the mobile object 30, or the like, that the run operation information of the mobile object 30 has been updated. This notification may be performed, for example, by transmitting an electronic mail, or may also be performed by transmitting a predetermined command to a run operation control apparatus (not illustrated) that controls run operations of the mobile object 30. The run operation information output control unit 11f corresponds to a second output control unit in the context of the present invention.

The control unit 11 of the moving sensor apparatus 1 according to this example is constituted by a hardware CPU, a memory, and other electronic circuits. When executing a data provision program according to the present invention, the hardware CPU operates as the device information obtaining unit 11a, the sensing data obtaining unit 11b, the provision data catalogue generation unit 11c, the sensing data output control unit 11d, the provision data catalogue output control unit 11e, the run operation information output control unit 11f, and the run operation information update unit 11g. In addition, the memory includes a region for deploying the data provision program according to the present invention, a region for temporarily storing data generated when this data provision program is executed, and the like. The control unit 11 may be an LSI in which the hardware CPU, the memory, and the like are integrated. In addition, the hardware CPU is a computer that executes a data provision method according to the present invention.

Figure 3:
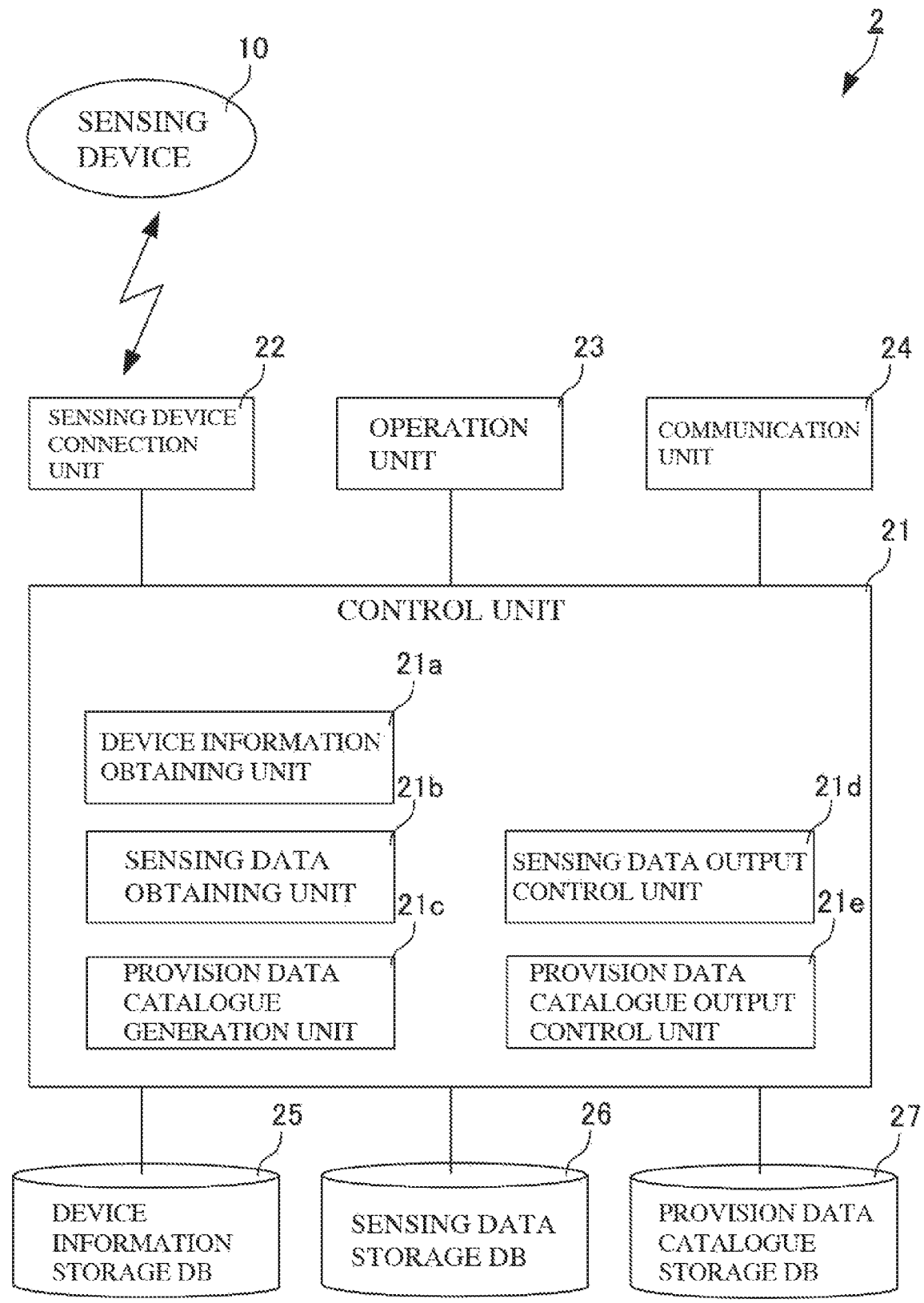
FIG. 3 is a block diagram illustrating a configuration of main constituent elements of a fixed sensor apparatus according to this example.

Next, the fixed sensor apparatus 2 according to this example will be described. FIG. 3 is a block diagram illustrating a configuration of main constituent elements of the fixed sensor apparatus according to this example. The fixed sensor apparatus 2 according to this example includes a sensing device 10, a control unit 21, a sensing device connection unit 22, an operation unit 23, a communication unit 24, a device information storage DB 25, a sensing data storage DB 26, and a provision data catalogue storage DB 27. As described above, the sensing device 10 is not a device of a specific type (the sensing device 10 is a device of a type selected by the manager of the fixed sensor apparatus 2 as necessary). The sensing device 10 of the fixed sensor apparatus 2 is not attached to the mobile object 30, and is installed at a location where an observed characteristic of an observation target can be sensed.

The sensing device connection unit 22 has a configuration similar to that of the above-described sensing device connection unit 12 of the moving sensor apparatus 1, and is connected to the sensing device 10 by wire or wirelessly. In addition, the operation unit 23 has a configuration similar to that of the above-described operation unit 13 of the moving sensor apparatus 1, and receives an operator's input operation on the main body of the fixed sensor apparatus 2. The communication unit 24 has a configuration similar to that of the above-described communication unit 14 of the moving sensor apparatus 1, and performs data communication with an external apparatus such as the network server 4 or an application system 3 via the network.

The device information storage DB 25 stores device attribute information indicating the attributes of the sensing device 10. The device information storage DB 25 is different from the attribute information storage DB 15 in that the device information storage DB 25 does not store mobile object attribute information indicating the attributes of the mobile object 30. The sensing data storage DB 26 stores a sensing time and sensing data in association with each other, for each observed characteristic of an observation target sensed by the sensing device 10. In addition, the sensing data storage DB 16 may be configured to store dynamic metadata and processed metadata. The provision data catalogue storage DB 27 stores the fixed sensor provision data catalogue 101. The fixed sensor provision data catalogue 101 will be described later in detail. If a fixed sensor provision data catalogue 101 is not registered in the network server 4, the fixed sensor apparatus 2 cannot trade (sell), in the SDTM, sensing data of this fixed sensor provision data catalogue 101 even if this fixed sensor provision data catalogue 101 is stored in the provision data catalogue storage DB 27. In other words, the fixed sensor apparatus 2 can only trade, in the SDTM, sensing data of a fixed sensor provision data catalogue 101 registered in the network server 4.

In addition, the control unit 21 includes a device information obtaining unit 21a, a sensing data obtaining unit 21b, a provision data catalogue generation unit 21c, a sensing data output control unit 21d, and a provision data catalogue output control unit 21e. The device information obtaining unit 21a, the sensing data obtaining unit 21b, the provision data catalogue generation unit 21c, the sensing data output control unit 21d, and the provision data catalogue output control unit 21e are respectively similar to the device information obtaining unit 11a, the sensing data obtaining unit 11b, the provision data catalogue generation unit 11c, the sensing data output control unit 11d, and the provision data catalogue output control unit 11e of the control unit 11 of a moving sensor apparatus 1, which have been described above. Description of the device information obtaining unit 21a, the sensing data obtaining unit 21b, the provision data catalogue generation unit 21c, the sensing data output control unit 21d, and the provision data catalogue output control unit 21e of the control unit 21 is omitted here.

Note that the provision data catalogue generation unit 21c generates the fixed sensor provision data catalogue 101.

The control unit 21 is also constituted by a hardware CPU, a memory, and other electronic circuits. The hardware CPU operates as the device information obtaining unit 21a, the sensing data obtaining unit 21b, the provision data catalogue generation unit 21c, the sensing data output control unit 21d, and the provision data catalogue output control unit 21e.

In this example, comparing the moving sensor apparatus 1 with the fixed sensor apparatus 2 in terms of hardware, the fixed sensor apparatus 2 is different from the moving sensor apparatus 1 in that the fixed sensor apparatus 2 does not have the structure of the moving sensor apparatus 1 related to the mobile object 30.

Figure 4:
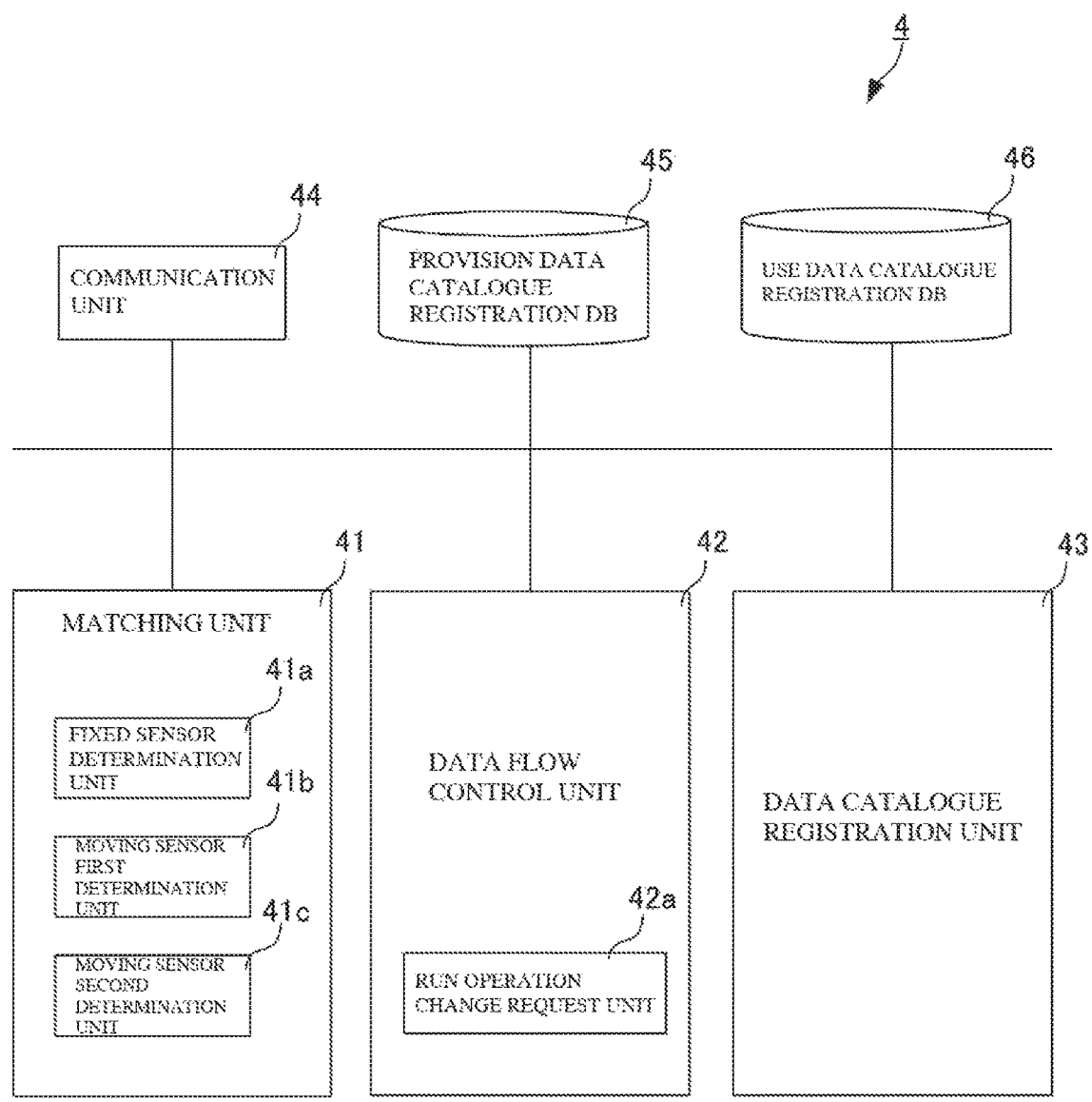
FIG. 4 is a block diagram illustrating a configuration of main constituent elements of a network server according to this example.

FIG. 4 is a block diagram illustrating the configuration of main constituent elements of the network server according to this example. The network server 4 includes a matching unit 41, a data flow control unit 42, a data catalogue registration unit 43, a communication unit 44, a provision data catalogue registration database 45 (provision data catalogue registration DB 45), and a use data catalogue registration database 46 (use data catalogue registration DB 46).

The communication unit 44 controls data communication between the moving sensor apparatuses 1, the fixed sensor apparatus 2, and the application systems 3. The provision data catalogue registration DB 45 stores the moving sensor provision data catalogues 100 transmitted from the moving sensor apparatuses 1, and the fixed sensor provision data catalogue 101 transmitted from the fixed sensor apparatus 2. The use data catalogue registration DB 46 stores use data catalogues 102 transmitted from the application systems 3.

The matching unit 41 extracts a moving sensor apparatus 1 or a fixed sensor apparatus 2 that can provide sensing data requested by an application system 3. The matching unit 41 includes a fixed sensor determination unit 41a, a moving sensor first determination unit 41b, and a moving sensor second determination unit 41c. The fixed sensor determination unit 41a makes a determination on the fixed sensor apparatus 2 that can provide sensing data requested by an application system 3, and extracts the fixed sensor apparatus 2. The moving sensor first determination unit 41b makes a determination on a moving sensor apparatus 1 that can provide sensing data requested by an application system 3 without changing the run operation information of the mobile object 30, and extracts the determined moving sensor apparatus 1. The moving sensor second determination unit 41c makes a determination on a moving sensor apparatus 1 that can provide sensing data requested by an application system 3 by changing the run operation information of the mobile object 30, and extracts the determined moving sensor apparatus 1. The moving sensor first determination unit 41b corresponds to a first determination unit in the context of the present invention, and the moving sensor second determination unit 41c corresponds to a second determination unit in the context of the present invention.

The matching unit 41 is constituted by a hardware CPU, a memory, and other electronic circuits. The hardware CPU operates as the fixed sensor determination unit 41a, the moving sensor first determination unit 41b, and the moving sensor second determination unit 41c.

The data flow control unit 42 instructs a moving sensor apparatus 1 or fixed sensor apparatus 2 that can provide sensing data requested by an application system 3, to provide sensing data to the application system 3. In addition, the data flow control unit 42 includes a run operation change request unit 42a. The run operation change request unit 42a performs notification for requesting the moving sensor apparatus 1 determined by the moving sensor second determination unit 41c to be able to provide sensing data requested by the application system 3 by changing the run operation information of the mobile object 30, to change the run operation information of the mobile object 30.

The data flow control unit 42 is constituted by a hardware CPU, a memory, and other electronic circuits. The hardware CPU operates as the run operation change request unit 42a.

The data catalogue registration unit 43 stores, in the provision data catalogue registration DB 45, a moving sensor provision data catalogue 100 transmitted from a moving sensor apparatus 1, and a fixed sensor provision data catalogue 101 transmitted from the fixed sensor apparatus 2. In addition, the data catalogue registration unit 43 stores, in the use data catalogue registration DB 46, a use data catalogue 102 transmitted from an application system 3.

Figure 5:
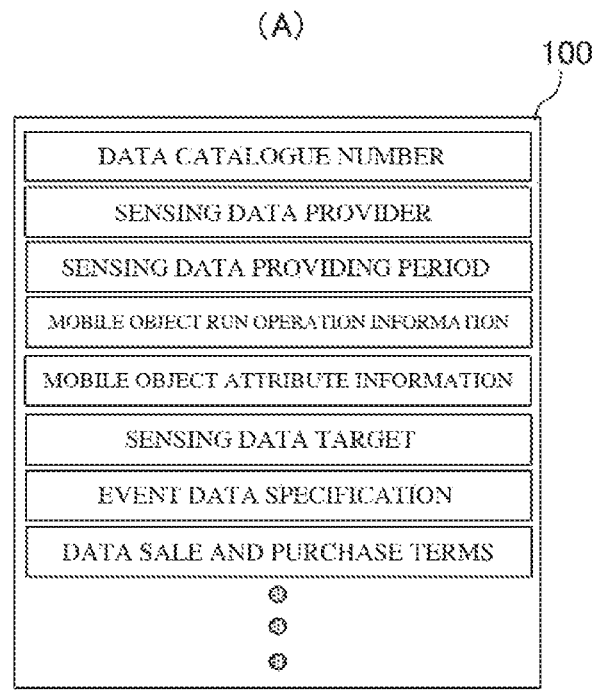
FIG. 5(A) is a diagram illustrating a moving sensor provision data catalogue.
FIG. 5(B) is a diagram illustrating a fixed sensor provision data catalogue.
Figure 5:
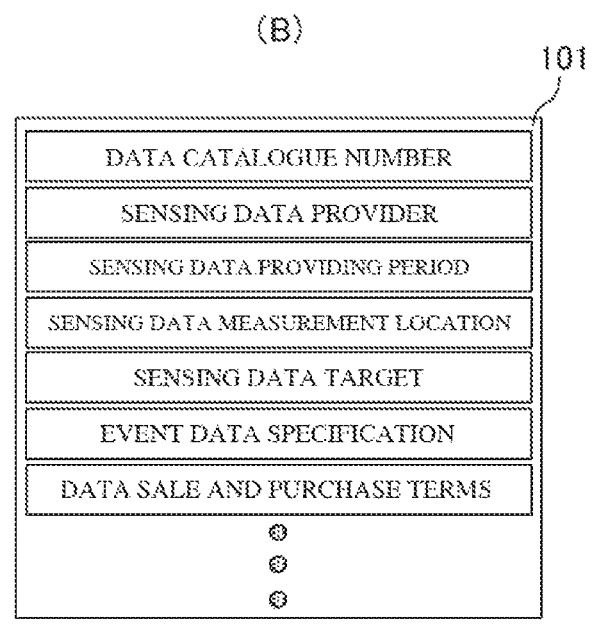
Figure 6:
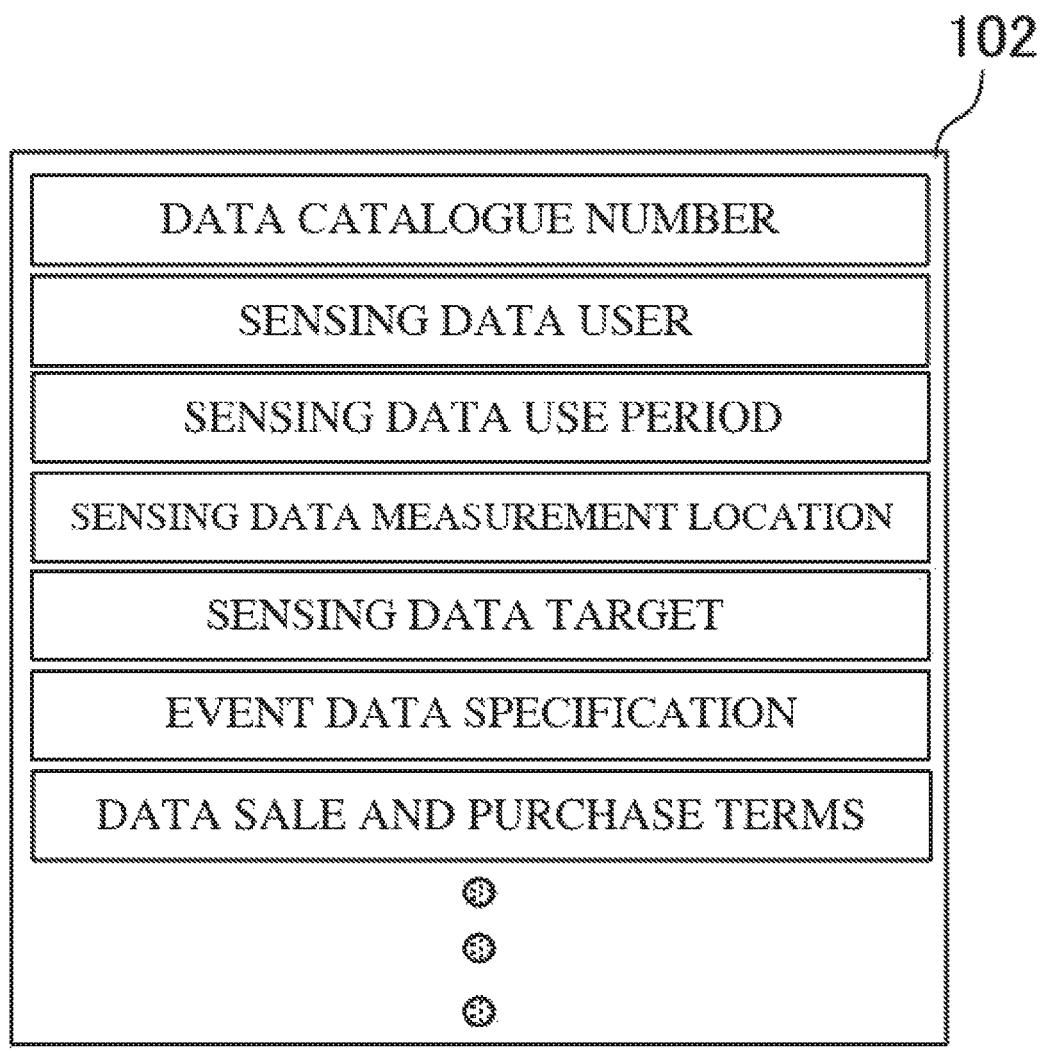
FIG. 6 is a diagram illustrating a use data catalogue.

Here, the moving sensor provision data catalogue 100, the fixed sensor provision data catalogue 101, and the use data catalogue 102 will be described. FIG. 5(A) is a diagram illustrating a moving sensor provision data catalogue, and FIG. 5(B) is a diagram illustrating a fixed sensor provision data catalogue. Also, FIG. 6 is a diagram illustrating a use data catalogue.

The moving sensor provision data catalogue 100 is metadata of sensing data that is provided by a moving sensor apparatus 1. The moving sensor provision data catalogue 100 includes a data catalogue number, a sensing data provider, a sensing data providing period, mobile object run operation information, mobile object attribute information, a sensing data target, an event data specification, and data sale and purchase contract terms, if roughly classified. The data catalogue number is a number for identifying the moving sensor provision data catalogue 100.

Attribute information regarding a sensing data provider is information regarding an organization (individual or business) that provides sensing data. The name of the organization that provides sensing data (organization name), contact information of the organization (contact information), and the like are written as attribute information regarding a sensing data provider.

Attribute information regarding a sensing data providing period is information regarding a period during which sensing data is provided. A date when providing of sensing data starts (start), a date when providing of sensing data ends (end), and the like are written as attribute information regarding a sensing data providing period.

The mobile object run operation information is information indicating a travelling path on which the mobile object 30 is scheduled to travel. This mobile object run operation information is information indicating a travelling path on which the mobile object 30 is scheduled to travel, and is, for example, information constituted by table data in which a time and date and the position of the mobile object 30 at the time and date are registered as a pair at appropriate time intervals (5 minute interval, 10 minute interval, etc.). Accordingly, the mobile object run operation information is information that makes it possible to specify the position of the mobile object 30, which is run, at any time and date. The mobile object run operation information is information created based on the run operation information of the mobile object 30 stored in the run operation information storage DB 18.

The mobile object attribute information is information indicating the type of the mobile object 30 ("drone", "self-driving vehicle", "helicopter", etc.), the maximum speed of the mobile object 30, a run operation permission period during which the mobile object 30 is permitted to run, a run operation permission region, and the like. The mobile object attribute information is information created based on mobile object attribute information stored in the attribute information storage DB 15.

Attribute information regarding a sensing data target is information regarding sensing data. A name of sensing data (sensing data name), brief description of sensing data (description of sensing data), a genre in which sensing data is used (genre name), an observation target, and the like are written as attribute information regarding a sensing data target. In addition, "observation target" is written for each observation target, and is constituted by information indicating the name of an observation target, description of an observation target, an observation target attribute, and the like. In addition, "observation target attribute" is constituted by information indicating the name of an observation target attribute, description of an observation target attribute, a unit of an observation target attribute, an observation time-and-date type (intermittent or constant) of an observation target attribute, and the like. "Sensing data target" is information created based on the device attribute information stored in the attribute information storage DB 15.

Attribute information regarding an event data specification represents a label name when information is written into "event condition" (event data identification name), the meaning and data expression of the value of event data (description of event data), and the like.

Attribute information regarding data sale and purchase contract terms is information regarding transaction of sensing data. "Use application" indicating a use application of sensing data (for-profit/non-profit/unlimited), "provision range" indicating whether or not sensing data can be provided to a third party, "trading conditions" indicating that data replication is not permitted/data replication is permitted/data modification is permitted/data processing is permitted, etc., "personal information" indicating whether or not sensing data includes personal information, "anonymous process information" regarding whether or not sensing data includes anonymous process information, "data effective period limit" indicating a start date and end date of an effective period of sensing data, "payment type" indicating a paying method for the cost for using sensing data, and the like are written as attribute information regarding data sale and purchase contract terms.

The fixed sensor provision data catalogue 101 is metadata of sensing data that is provided by the fixed sensor apparatus (es) 2. If roughly classified, the fixed sensor provision data catalogue 101 includes a data catalogue number, a sensing data provider, a sensing data provision period, a sensing data measurement location, an event data specification, and data sale and purchase contract terms. The fixed sensor provision data catalogue 101 is different from the above-described moving sensor provision data catalogue 100 in that items related to the fixed sensor provision data catalogue 101 do not include items related to mobile object run operation information and mobile object attribute information, and in that the fixed sensor provision data catalogue 101 includes an item related to a sensing data measurement location. "Sensing data measurement location" is attribute information related to a location where an observation target is sensed (i.e., location where the sensing device 10 is installed).

Furthermore, the use data catalogue 102 shown in FIG. 6 includes a data catalogue number, a sensing data user, a sensing data use period, a sensing data measurement location, an event data specification, and data sale and purchase contract terms, if roughly classified. The data catalogue number is a number for identifying the use data catalogue 102.

Attribute information regarding a sensing data user is information regarding an organization that uses sensing data (individual or business). The name of an organization (organization name), contact information of an organization (contact information), and the like are written as attribute information regarding a sensing data user.

Attribute information regarding a sensing data use period is information regarding a period during which sensing data is used. A date when use of sensing data starts (start), day when use of sensing date ends (end), and the like are written as attribute information regarding a sensing data use period.

"Sensing data measurement location" is attribute information regarding a location where an observation target is sensed similarly to that of the fixed sensor provision data catalogue 101. "Sensing data target" is attribute information regarding an observation target and an observed characteristic, similarly to those of the moving sensor provision data catalogue 100 and the fixed sensor provision data catalogue 101. "Event data specification" is attribute information regarding an event condition similarly to those of the moving sensor provision data catalogue 100 and the fixed sensor provision data catalogue 101. "Data sale and purchase contract terms" is attribute information related to transaction of sensing data similarly to those of the moving sensor provision data catalogue 100 and the fixed sensor provision data catalogue 101.

Note that a hardware configuration and software configuration of an application system 3 have not been described in particular, but this application system 3 can be configured as an information processing terminal such as a general-purpose personal computer or a tablet terminal. It suffices for the application system 3 to execute an application program in which sensing data provided by the sensing data distribution system according to this example is used as input data. For example, this application program may be a program for forecasting sales of a commercial product such as ice cream at a specific point, a program for estimating a length of traffic congestion at a specific intersection after a predetermined time, or a program for predicting or estimating a phenomenon and the like other than those described above. Accordingly, any application program can be adopted as long as a user of sensing data can obtain a necessary processing result.

Operations of a moving sensor apparatus 1, the fixed sensor apparatus 2, and the network server 4 of the sensing data distribution system according to this example will be described below. A detailed description of the application system 3 is omitted.

Figure 7:
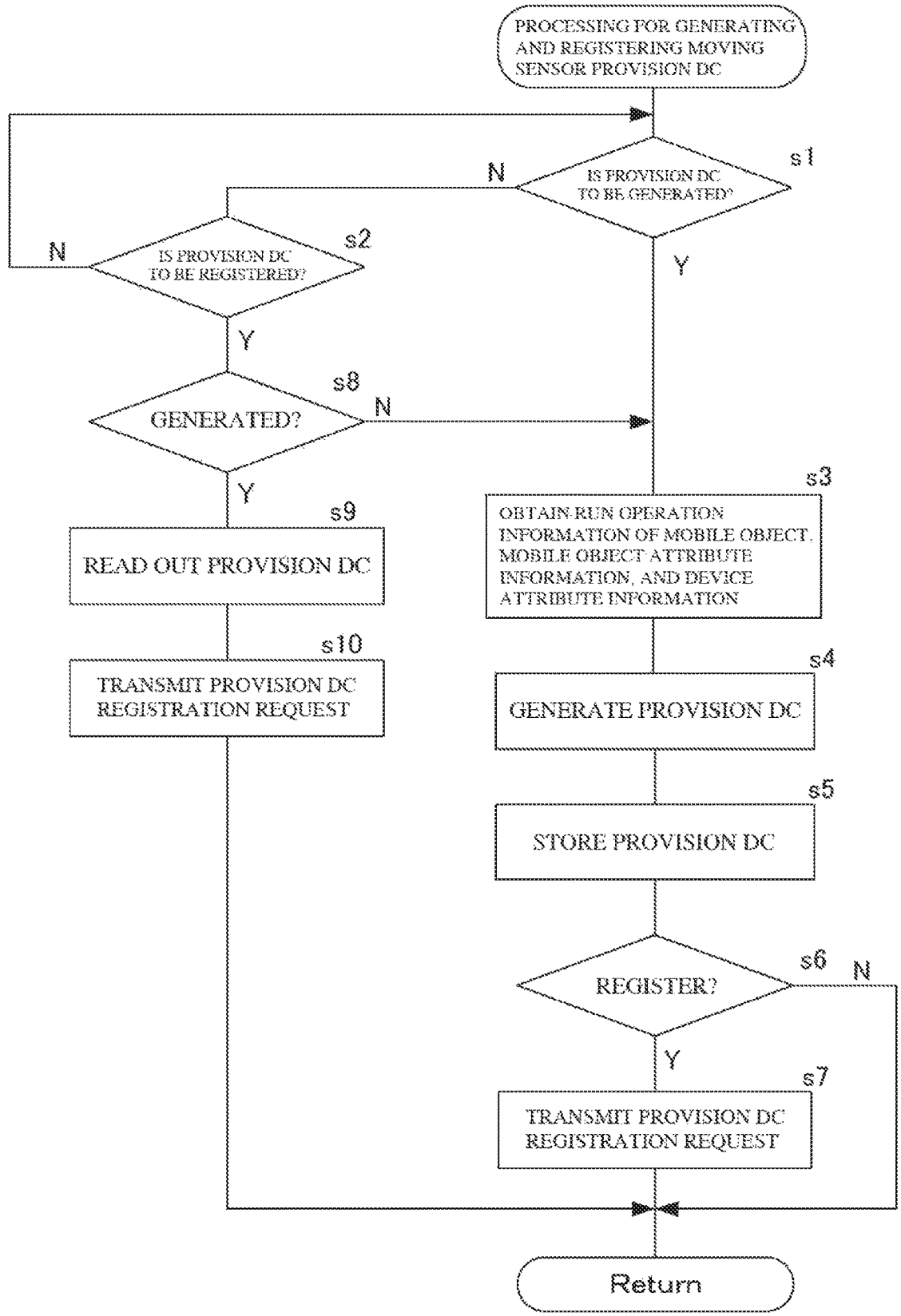
FIG. 7 is a flowchart illustrating processing for generating and registering a moving sensor provision data catalogue of a moving sensor apparatus.

First, processing for generating a moving sensor provision data catalogue 100 and processing for registering the moving sensor provision data catalogue 100 in the network server 4, which are performed by a moving sensor apparatus 1, will be described. FIG. 7 is a flowchart illustrating processing for generating and registering a moving sensor provision data catalogue, which is performed by a moving sensor apparatus. In FIG. 7, the "moving sensor provision data catalogue 100" is referred to as "provision DC".

The moving sensor apparatus 1 repeatedly determines whether or not to generate a moving sensor provision data catalogue 100, and whether or not to register a moving sensor provision data catalogue 100 in the network server 4 (steps s1 and s2). The moving sensor apparatus 1 determines in step s1 whether or not an event related to generation of a moving sensor provision data catalogue 100 has occurred. The event related to generation of a moving sensor provision data catalogue 100 is set in advance. The event related to generation of a moving sensor provision data catalogue 100 is, for example, an input operation on the operation unit 13 for generation of a moving sensor provision data catalogue 100, input of a command for generation of a moving sensor provision data catalogue 100 from an external apparatus, connection of a new sensing device 10 by the sensing device connection unit 12, or the like.

Note that one or more types of events related to generation of a moving sensor provision data catalogue 100 can be set in the moving sensor apparatus 1.

In addition, the moving sensor apparatus 1 determines in step s2 whether or not an event related to registration of a moving sensor provision data catalogue 100 has occurred. The event related to registration of a moving sensor provision data catalogue 100 is, for example, an input operation on the operation unit 13 for registration of a moving sensor provision data catalogue 100, input of a command for registration of a moving sensor provision data catalogue 100 from an external apparatus, completion of generation of a moving sensor provision data catalogue 100, or the like.

Note that one or more types of events related to registration of a moving sensor provision data catalogue 100 can be set in the moving sensor apparatus 1.

If a determination is made in step s1 to generate a moving sensor provision data catalogue 100, the moving sensor apparatus 1 obtains the run operation information of the mobile object 30 to which a corresponding sensing device 10 is attached, mobile object attribute information of this mobile object 30, and device attribute information of this sensing device 10 (step s3). In step s3, for example, the provision data catalogue generation unit 11c reads out the mobile object attribute information of the mobile object 30 and the device attribute information of the sensing device 10 from the attribute information storage DB 15, and reads out the run operation information of the mobile object 30 from the run operation information storage DB 18. In addition, the provision data catalogue generation unit 11c may also obtain the run operation information, the mobile object attribute information, and the device attribute information in accordance with an operator's input operation on the operation unit 13.

The provision data catalogue generation unit 11c generates the moving sensor provision data catalogue 100 shown in FIG. 5(A) based on the run operation information, mobile object attribute information, and device attribute information obtained in step s3 (step s4). The provision data catalogue generation unit 11c stores the moving sensor provision data catalogue 100 generated in step s4, in the provision data catalogue storage DB 17 (step s5).

The moving sensor apparatus 1 determines whether or not to register the moving sensor provision data catalogue 100 in the network server 4 (step s6). When the procedure advances from step s5 to step s6, the moving sensor apparatus 1 determines whether or not to register the moving sensor provision data catalogue 100 generated in step s4 this time, in the network server 4. If the moving sensor apparatus 1 makes a determination in step s6 to not register the moving sensor provision data catalogue 100 in the network server 4, the procedure returns to step s1. In addition, if the moving sensor apparatus 1 makes a determination in step s6 to register the moving sensor provision data catalogue 100 in the network server 4, the provision data catalogue output control unit 11e controls the communication unit 14 to transmit a provision data catalogue registration request to the network server 4 (step s7), and the procedure returns to step s1. The provision data catalogue registration request transmitted to the network server 4 in step s7 includes the moving sensor provision data catalogue 100 determined in step s6 to be registered in the network server 4.

Note that the process in step s5 may also be executed after the processes in steps s6 and s7 are complete.

In addition, if a determination is made in step s2 to register a moving sensor provision data catalogue 100, the moving sensor apparatus 1 determines whether or not a moving sensor provision data catalogue 100 to be registered this time has been generated already (step s8). If it is determined in step s8 that the moving sensor provision data catalogue 100 has not been generated, the moving sensor apparatus 1 executes the above-described processes in step s3 onward.

If it is determined in step s8 that the moving sensor provision data catalogue 100 has been generated, the moving sensor apparatus 1 reads out the moving sensor provision data catalogue 100 to be registered in the network server 4 this time from the moving sensor provision data catalogues 100 that are stored in the provision data catalogue storage DB 17 (step s9). In the moving sensor apparatus 1, the provision data catalogue output control unit 11e controls the communication unit 14 to transmit a provision data catalogue registration request to the network server 4 (step s10), and the procedure returns to step s1. The provision data catalogue registration request transmitted to the network server 4 in step s10 includes the moving sensor provision data catalogue 100 read out from the provision data catalogue storage DB 17 in step s9.

Upon receiving the provision data catalogue registration request using the communication unit 44, the network server 4 stores, in the provision data catalogue registration DB 45, the moving sensor provision data catalogue 100 or the fixed sensor provision data catalogue 101 included in this provision data catalogue registration request. This processing is executed by the data catalogue registration unit 43. As described above, the moving sensor apparatus 1 transmits the provision data catalogue registration request to the network server 4 in step s7 or s10.

In addition, the fixed sensor apparatus 2 also performs processing related to generation and registration of a fixed sensor provision data catalogue 101, which is substantially the same processing as that of the moving sensor apparatus 1 shown in FIG. 7. The fixed sensor apparatus 2 is different from the above-described moving sensor apparatus 1 in that the fixed sensor apparatus 2 generates a fixed sensor provision data catalogue 101 without using information related to the mobile object 30 (mobile object run operation information and mobile object attribute information).

Figure 8:
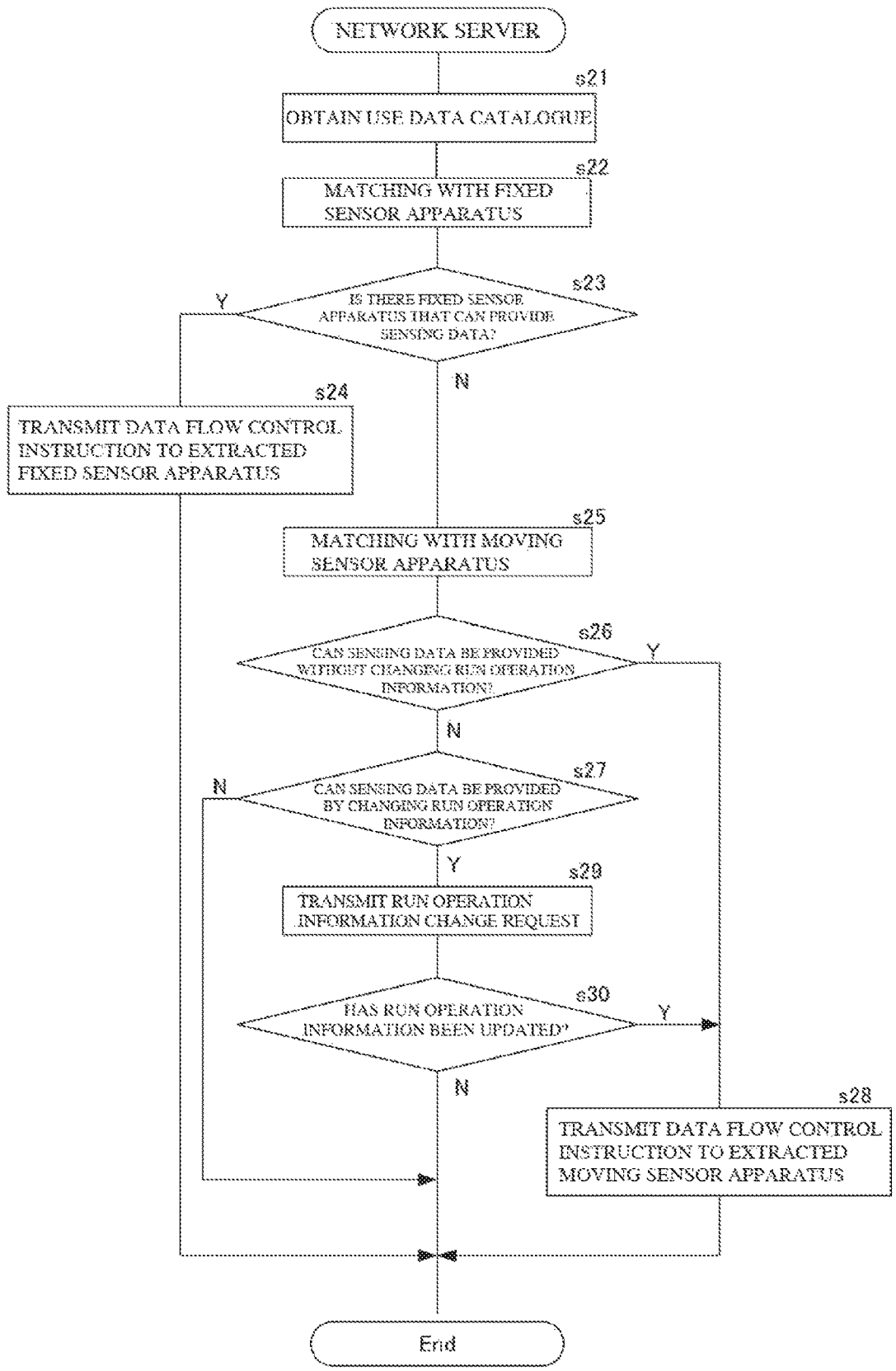
FIG. 8 is a flowchart illustrating operations of the network server according to this example.

FIG. 8 is a flowchart illustrating operations of the network server according to this example. FIG. 8 illustrates matching processing and data flow control processing in the network server 4. When a matching request is given from an application system 3, the network server 4 executes processing shown in FIG. 8.

Upon receiving the matching request transmitted from the application system 3 using the communication unit 44, the network server 4 obtains a use data catalogue 102 corresponding to this matching request (step s21). If the matching request received this time includes a use data catalogue 102 in step s21, this use data catalogue 102 is obtained. If the matching request received this time does not include any use data catalogue 102, the use data catalogue registration DB 46 is searched, and a corresponding use data catalogue 102 is read out.

Note that, in the network server 4, if the matching request received this time includes a use data catalogue 102, and no use data catalogue 102 is registered in the use data catalogue registration DB 46, the data catalogue registration unit 43 performs processing for registering the use data catalogue 102 included in the matching request received this time, in the use data catalogue registration DB 46.

The fixed sensor determination unit 41a of the matching unit 41 performs matching processing by combining the use data catalogue 102 obtained step s21 with the fixed sensor provision data catalogue 101 registered in the provision data catalogue registration DB 45 (step s22), and determines whether or not there is any fixed sensor apparatus 2 that can provide sensing data requested by the application system 3 (step s23). If the fixed sensor determination unit 41a determines that there is a fixed sensor apparatus 2 that can provide sensing data requested by the application system 3, the network server 4 transmits, to the fixed sensor apparatus 2, a data flow control instruction instructing that the sensing data be provided to the user (step s24), and ends this processing. In step s24, the data flow control unit 42 controls the communication unit 44 to transmit the data flow control instruction to the fixed sensor apparatus 2.

If the fixed sensor determination unit 41a determines that there is no fixed sensor apparatus 2 that can provide sensing data requested by the application system 3, the matching unit 41 performs matching processing by combining the use data catalogue 102 obtained in step s21 with the moving sensor provision data catalogue 100 registered in the provision data catalogue registration DB 45 (step s25). The moving sensor first determination unit 41b determines whether or not there is any moving sensor apparatus 1 that can provide sensing data requested by the application system 3 without changing the run operation information of the mobile object 30 (step s26). In the matching unit 41, if the moving sensor first determination unit 41b determines in step s26 that there is no moving sensor apparatus 1 that can provide sensing data requested by the application system 3 without changing the run operation information of the mobile object 30, the procedure advances to step s27. In step s27, the moving sensor second determination unit 41c determines whether or not there is any moving sensor apparatus 1 that can provide sensing data requested by the application system 3 by changing the run operation information of the mobile object 30.

In this step s27, for example, a determination is made as to whether or not there is any moving sensor apparatus 1 that can provide sensing data requested by the application system 3 by changing the run operation information of the mobile object 30, based on conditions such as:

(1) the sensing device 10 attached to the mobile object 30 can obtain sensing data of a type requested by the application system 3, (2) the environment of a location where sensing data requested by the application system 3 is obtained is an environment that can be reached by the mobile object 30 (geography, height, etc.), and (3) the position of the mobile object 30 at a time and date when sensing data requested by the application system 3 is obtained is in the vicinity of a location where sensing data requested by the application system 3 is obtained.

If the moving sensor first determination unit 41b determines that there is a moving sensor apparatus 1 that can provide sensing data requested by the application system 3 without changing the run operation information of the mobile object 30, the matching unit 41 transmits, to the moving sensor apparatus 1, a data flow control instruction instructing that sensing data be provided to the user (step s28), and ends this processing. In step s28, the data flow control unit 42 controls the communication unit 44 to transmit the data flow control instruction to the fixed sensor apparatus 2.

If the moving sensor first determination unit 41b determines that there is no moving sensor apparatus 1 that can provide sensing data requested by the application system 3 without changing the run operation information of the mobile object 30, and the moving sensor second determination unit 41c determines that there is a moving sensor apparatus 1 that can provide sensing data requested by the application system 3 by changing the run operation information of the mobile object 30, a run operation information change request is transmitted to the moving sensor apparatus 1 determined by the moving sensor second determination unit 41c to be able to provide sensing data requested by the application system 3 by changing the run operation information of the mobile object 30 (step s29). This run operation information change request includes a content of the run operation information of the mobile object 30 to be changed. In step s29, the run operation change request unit 42a of the data flow control unit 42 controls the communication unit 44 to transmit the run operation information change request to the moving sensor apparatus 1.

Figure 9:
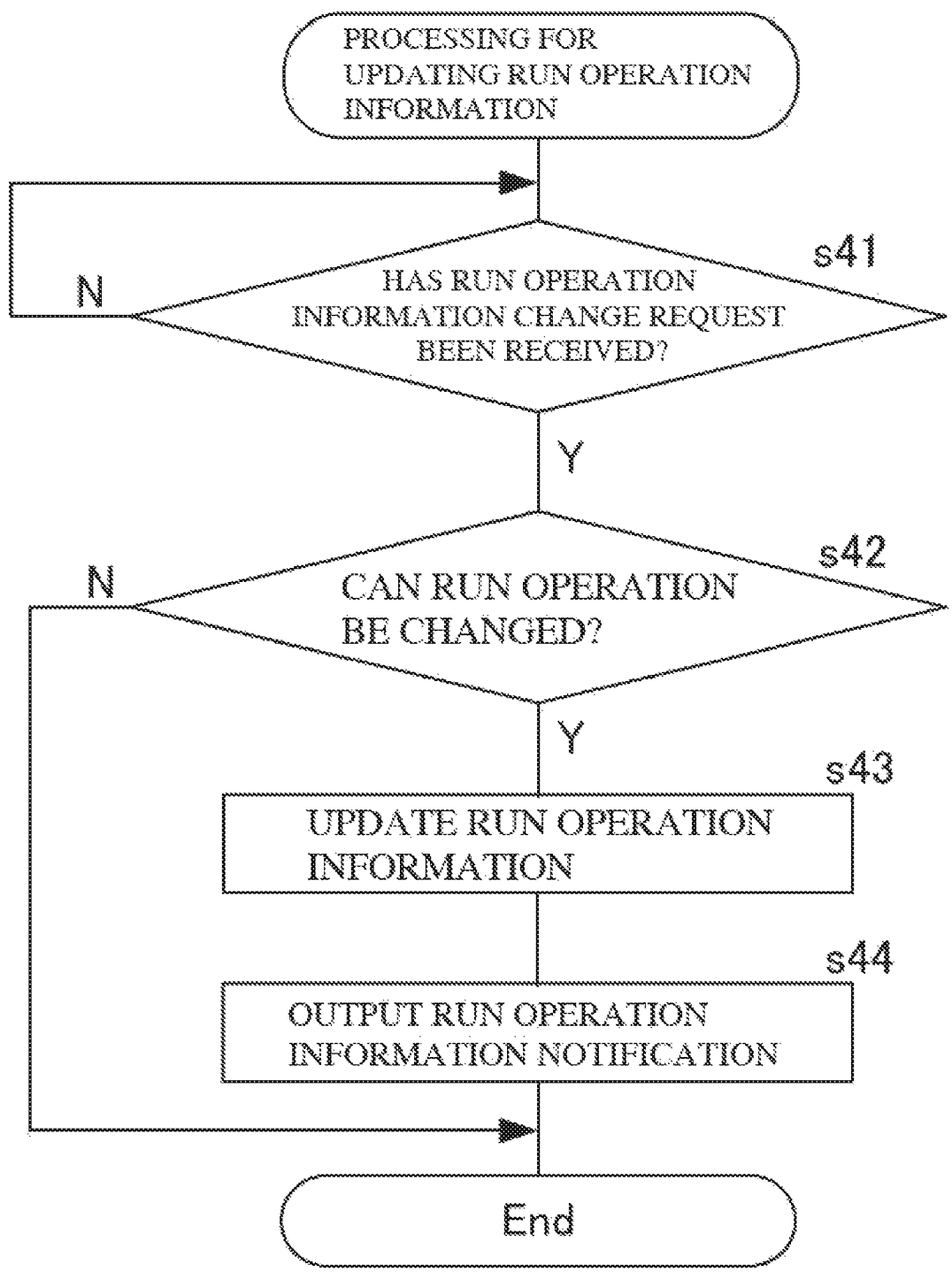
FIG. 9 is a flowchart illustrating processing for updating run operation information in a moving sensor apparatus according to this example.

Here, run operation information update processing of the moving sensor apparatus 1 according to this example will be described. FIG. 9 is a flowchart illustrating run operation information update processing of the moving sensor apparatus according to this example. Upon receiving, using the communication unit 14, a run operation information change request transmitted from the network server 4 (step s41), the moving sensor apparatus 1 determines whether or not the run operation information update unit 11g can change the run operation of the mobile object 30 to a run operation that is based on this request (step s42). In step s42, a determination is made as to whether or not the change in the run operation disturbs the run operation of the mobile object 30, whether or not there is some limit (restriction) to a change in the run operation of the mobile object 30 to the requested run operation, and the like.

If it is determined in step s42 that the run operation of the mobile object 30 cannot be changed, the run operation information update unit 11g ends this processing. If it is determined in step s42 that the run operation of the mobile object 30 can be changed, the run operation information update unit 11g updates the run operation of the mobile object 30 to the run operation information of the mobile object 30 stored in the run operation information storage DB 18 according to the run operation change request received this time (step s43). In addition, the run operation information output control unit 11f notifies the run operation manager that manages run operations of the mobile object 30 and the network server 4 that the run operation information of the mobile object 30 has been updated (step s44), and ends this processing.

For example, if the mobile object 30 is a drone, the run operation manager may be the operator that operates the drone.

Figure 10:
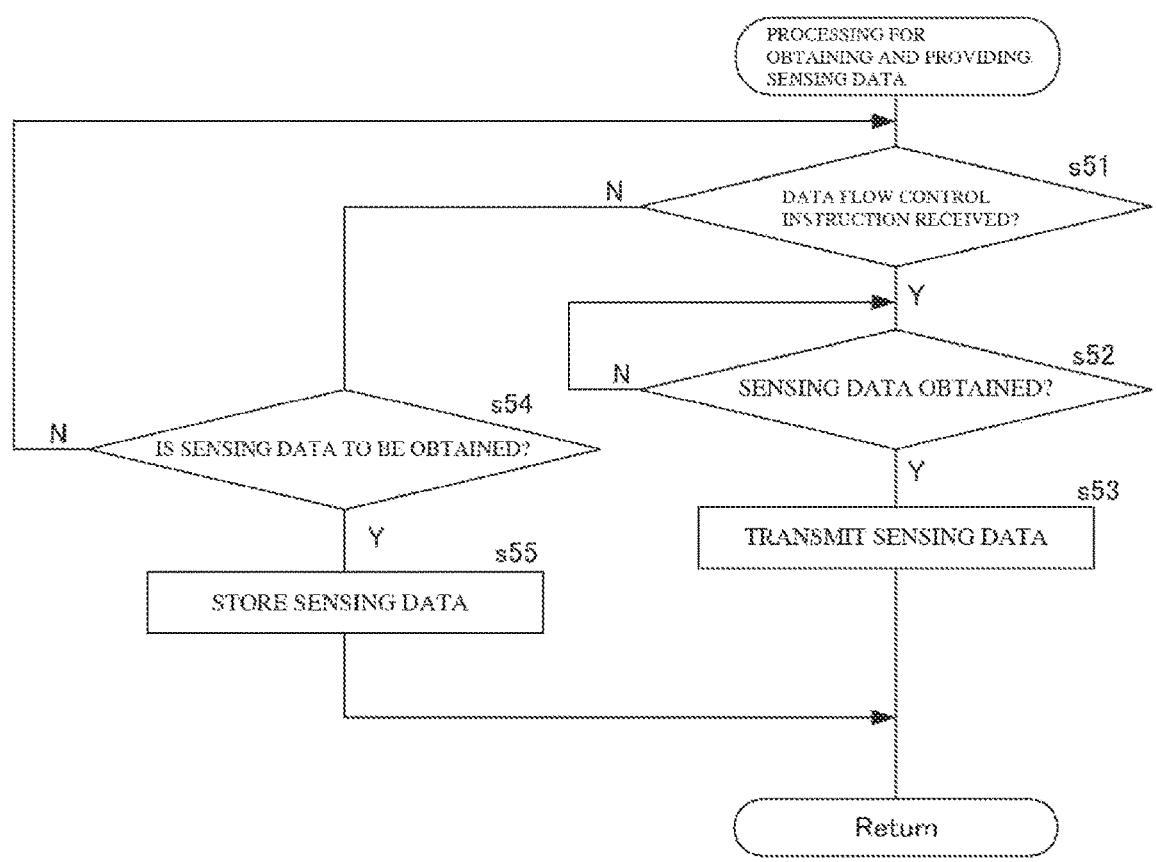
FIG. 10 is a flowchart illustrating processing for obtaining and providing sensing data, in the moving sensor apparatus according to this example.

Note that the moving sensor apparatus 1 executes, in parallel, the processing for generating and registering a moving sensor provision data catalogue shown in FIG. 7, the run operation information update processing shown in FIG. 9, the processing for obtaining and providing sensing data shown in FIG. 10, and the like.

Returning to FIG. 8, the network server 4 determines whether or not the run operation information of the mobile object 30 has been changed and updated in the moving sensor apparatus 1 to which the run operation information update request was transmitted in step s29 (step s30). If the network server 4 is notified from the moving sensor apparatus 1 that the run operation information has been updated before a certain time period elapses after the run operation change request of the mobile object 30 was transmitted to the moving sensor apparatus 1 in step s29, the network server 4 determines that this run operation information of the mobile object 30 has been updated. In other words, if the network server 4 is not notified from the moving sensor apparatus 1 that the run operation information has been updated before a certain time period elapses after the run operation change request of the mobile object 30 was transmitted to the moving sensor apparatus 1 in step s29, the network server 4 determines that this run operation information of the mobile object 30 has not been updated.

If it is determined in step s30 that the run operation information of the mobile object 30 has not been updated, the network server 4 ends this processing. At this time, the application system 3 that transmitted a matching request this time is notified that there is no sensing data that can be provided at the present point in time (there is no moving sensor apparatus 1 or fixed sensor apparatus 2 that can provide sensing data). Also if it is determined in step s27 that there is no moving sensor apparatus 1 that can provide sensing data requested by the application system 3 even by changing the run operation information of the mobile object 30, the network server 4 notifies the application system 3 that transmitted the matching request this time, that there is no sensing data that can be provided at the present point in time.

In addition, if it is determined in step s30 that the run operation information of the mobile object 30 has been changed and updated, the network server 4 transmits, to the moving sensor apparatus 1, a data flow control instruction instructing that sensing data be provided to the user (step s28), and ends this processing. In step s28, as described above, the data flow control unit 42 controls the communication unit 44 to transmit the data flow control instruction to the moving sensor apparatus 1.

Here, processing for obtaining and providing sensing data that is performed by a moving sensor apparatus 1 of this example will be described. FIG. 10 is a flowchart illustrating the processing for obtaining and providing sensing data that is performed in the moving sensor apparatus according to this example. The moving sensor apparatus 1 waits until a data flow control instruction is input from the network server 4 (step s51), or sensing data obtained by sensing an observed characteristic of an observation target is input from the sensing device 10 (step s54).

In the moving sensor apparatus 1, when sensing data obtained by sensing an observed characteristic of an observation target is input from the sensing device 10 to the sensing device connection unit 12, the sensing data obtaining unit 11*b* stores, in the sensing data storage DB 26, the sensing data input this time (step s55), and the procedure returns to step s51. By performing this processing, the moving sensor apparatus 1 accumulatively stores, in the sensing data storage DB 26, sensing data obtained by the sensing device 10 connected to the sensing device connection unit 12 sensing an observed characteristic of an observation target.

In addition, when the data flow control instruction is input from the network server 4, the moving sensor apparatus 1 determines whether or not sensing data to be provided to the application system 3 according to this data flow control instruction has already been obtained (step s52). The moving sensor apparatus 1 waits in step s52 until sensing data to be provided to the application system 3 is obtained. If it is determined in step s52 that sensing data to be provided to the application system 3 has been obtained, the moving sensor apparatus 1 transmits the sensing data to the application system 3 (step s53), and the procedure returns to step s51.

Note that, also during a period during which the moving sensor apparatus 1 waits in step s52 until sensing data to be provided to the application system 3 is obtained, the sensing data obtaining unit 11*b* stores sensing data input from the sensing device 10 to the sensing device connection unit 12, in the sensing data storage DB 26. The moving sensor apparatus 1 may be configured to transmit sensing data to the application system 3 via the network server 4 in step s53, or may also be configured to transmit sensing data to the application system 3 without intervention of the network server 4.

In addition, although not described in particular, the fixed sensor apparatus 2 also executes the processing for obtaining and providing sensing data shown in FIG. 10.

As described above, in the moving sensor apparatus 1 according to this example, the sensing device 10 is attached to the mobile object 30. Therefore, even if there is no sensing device 10 installed at a position at which sensing data required by the application system 3 can be obtained, if there is a mobile object 30 that travels through a position at which sensing data required by the application system 3 can be obtained, sensing data can be provided to the application system 3. Moreover, the run operation information of the mobile object 30 can be updated according to sensing data required by the application system 3. Therefore, a frequency at which a situation occurs in which a user cannot receive necessary sensing data is reduced, and utilization of sensing data is promoted.

Moreover, when the run operation information of the mobile object 30 is updated, the run operation information output control unit 11*f* notifies the run operation manager that manages run operations of the mobile object 30 that the run operation information of the mobile object 30 has been updated. Therefore, the run operation manager promptly recognizes that the run operation information of the mobile object 30 has been updated, and the mobile object 30 can be run based on the updated run operation information. This suppresses the occurrence of a situation where the mobile object 30 cannot be moved to a position at which sensing data required by the application system 3 can be obtained, due to delay in run operation control of the mobile object 30. Specifically, it is possible to suppress a failure to obtain sensing data required by the application system 3 as a result of the run operation information of the mobile object 30 having been updated in order to obtain sensing data required by the application system 3, but the mobile object 30 not being able to be moved to a position at which sensing data required by the application system 3 can be obtained, due to delay in run operation control of the mobile object 30.

If sensing data required by the application system 3 can be obtained by the fixed sensor apparatus 2, or can be obtained by the moving sensor apparatus 1 without changing the run operation information of the mobile object 30, the network server 4 does not change the run operation information of the mobile object 30. Therefore, the run operation information of the mobile object 30 is not updated unnecessarily.

Figure 11:
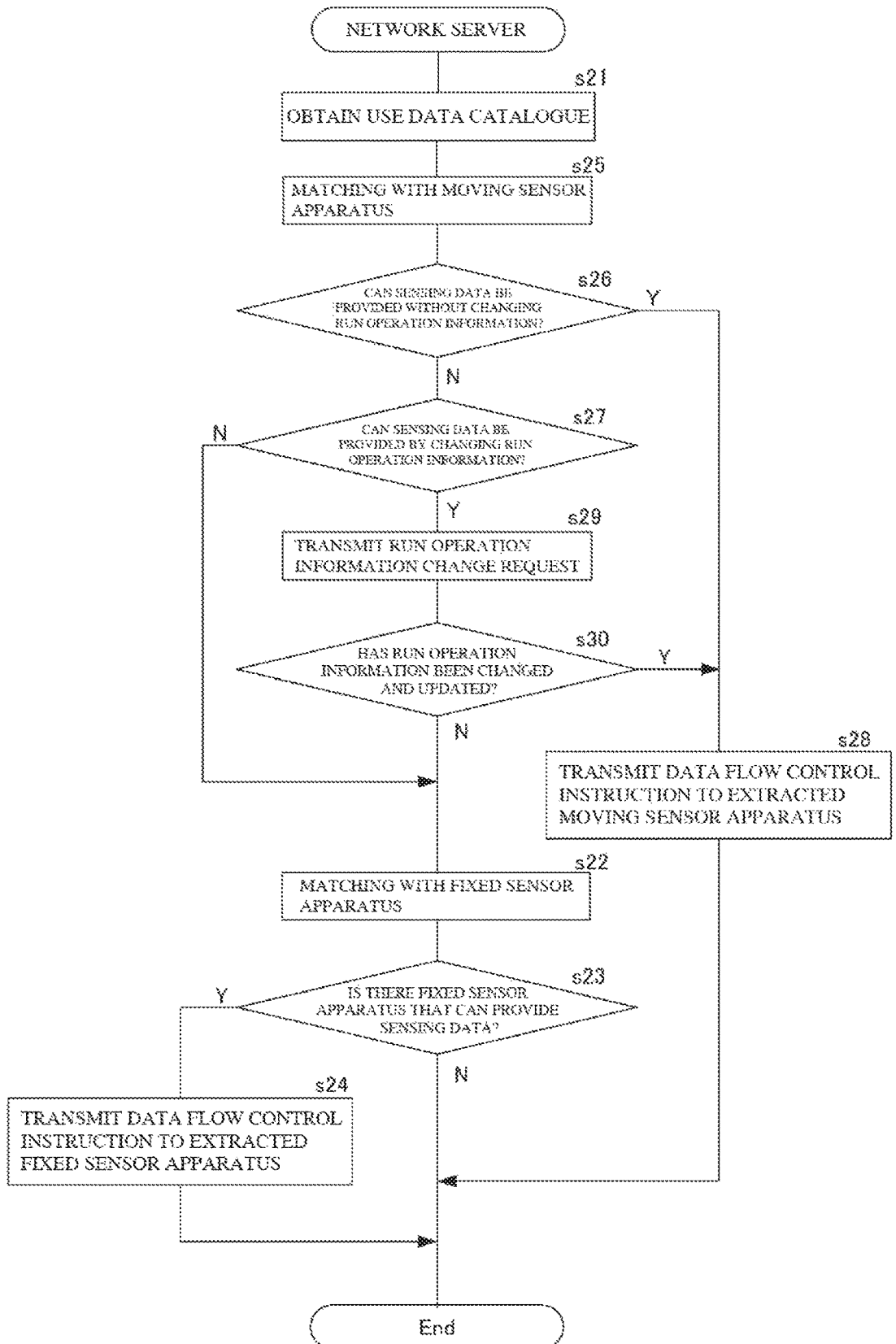
FIG. 11 is a flowchart illustrating operations of a network server according to another example.

In addition, in the sensing data distribution system of the above-described example, a configuration is adopted in which, as an apparatus that provides sensing data to an application system 3, the priority of the fixed sensor apparatus 2 is higher than the priority of a moving sensor apparatus 1, but a configuration may also be adopted in which, as an apparatus that provides sensing data to an application system 3, the priority of a moving sensor apparatus 1 is higher than the priority of the fixed sensor apparatus 2. In this case, it is sufficient that the matching processing and data flow control processing in the network server 4 shown in FIG. 8 are changed to processing shown in FIG. 11. In FIG. 11, the same step numbers (step s) are assigned to processes same as those in FIG. 8. The network server 4 in the example shown in this FIG. 11** performs the processes in steps s25 to s30 before the processes in step s22 to step s24.

Figure 12:
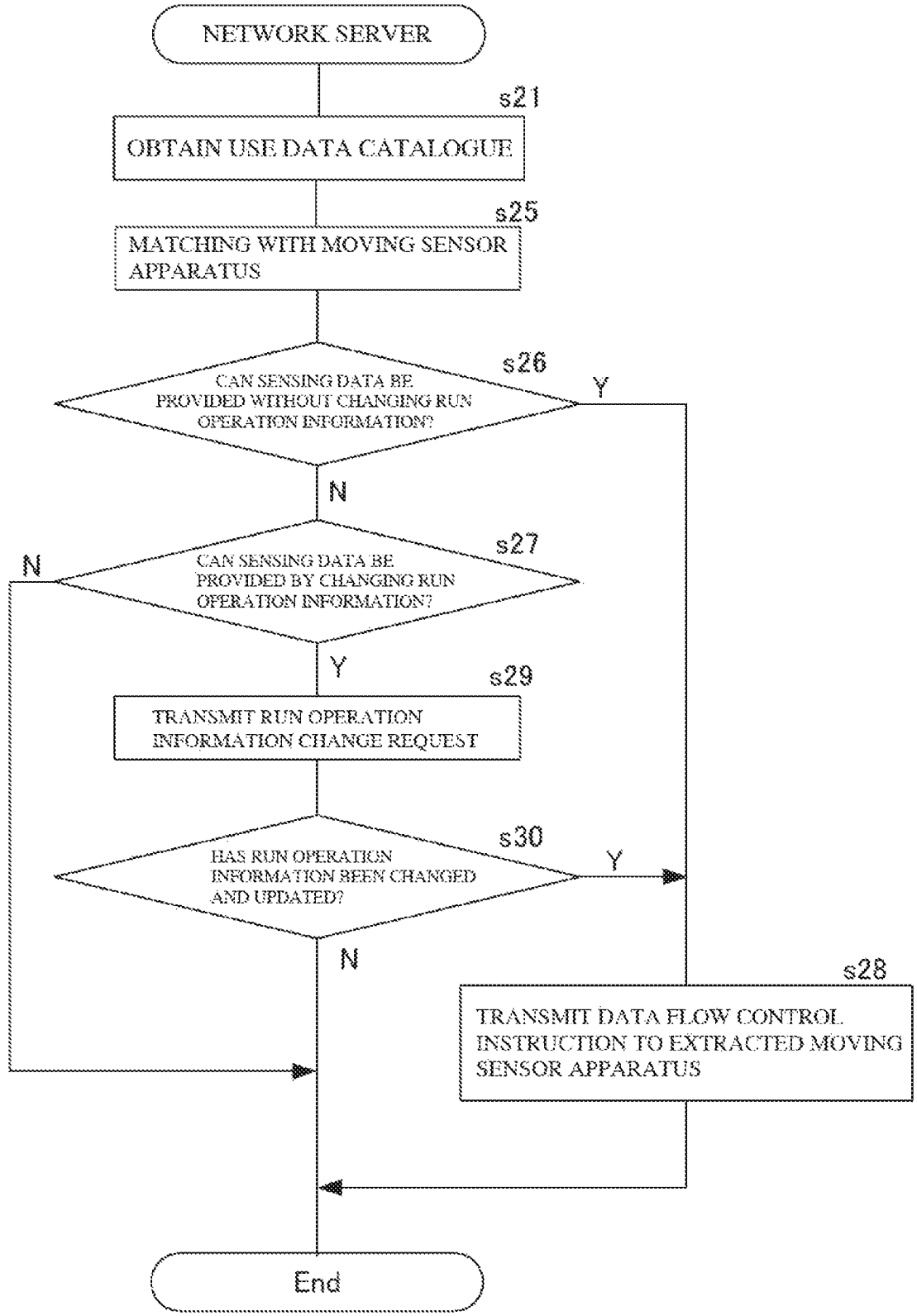
FIG. 12 is a flowchart illustrating operation of a network server according to another example.

In addition, a configuration may also be adopted in which the sensing data distribution system does not include the fixed sensor apparatus 2. In this case, it is sufficient that the network server 4 performs the processing shown in FIG. 12 without matching processing and data flow control processing. Also in this FIG. 12, the same step numbers (step s) are assigned to processes same as those in FIGS. 8 and 11. A configuration is adopted in which the network server 4 according to this example does not execute the processes in steps s22 to s24 shown in FIGS. 8 and 11**.

In addition, the above-described moving sensor apparatus 1 is not limited to a configuration in which the sensing device 10 connected to the sensing device connection unit 12 is attached to the mobile object 30, and a configuration may also be adopted in which the sensing device 10 installed at a certain point is also connected (to the sensing device connection unit 12). With such a configuration, the moving sensor apparatus 1 can be used as not only a moving sensor apparatus 1 in the above example, but also a fixed sensor apparatus 2.

Moreover, in the above example, a configuration is adopted in which the network server 4 transmits a data flow control instruction regardless of whether or not a moving sensor apparatus 1 or the fixed sensor apparatus 2 has obtained sensing data to be provided to the application system 3, but a configuration may also be adopted in which the network server 4 transmits a data flow control instruction after confirming that a moving sensor apparatus 1 or the fixed sensor apparatus 2 has obtained sensing data to be provided to the application system 3. Accordingly, in the above example, the moving sensor apparatus 1 and the fixed sensor apparatus 2 manage transmission timings of sensing data to be provided to the application system 3, but a configuration may also be adopted in which this management is performed by the network server 4. In this case, it suffices for the network server 4 to be provided with a configuration for checking whether or not the moving sensor apparatus 1 or the fixed sensor apparatus 2 has obtained sensing data to be provided to the application system 3.

Note that the present invention is not limited to the above embodiment as is, and, when implemented, constituent elements can be modified and embodied without departing from the gist of the present invention. In addition, various inventions can be formed by appropriately combining a plurality of constituent elements disclosed in the above embodiment. For example, several constituent elements may be deleted from all of the constituent elements mentioned in the embodiment. Furthermore, constituent elements in different embodiments may be combined as appropriate.

A portion or the entirety of the above embodiment can be described as Supplemental Notes below, but there is no limitation thereto.

(Supplementary Note 1)

A sensor management unit comprising at least one hardware processor, wherein the hardware processor is configured to obtain sensing data obtained by a sensing device attached to a mobile object sensing an observed characteristic of an observation target, when a request to provide the sensing data is received, output the sensing data that is based on this provision request to a user, and when a run operation change request to change a run operation of the mobile object is received, update run operation information of the mobile object stored in a run operation information storage unit, according to the run operation change request.

(Supplementary Note 2)

A sensor management method that uses at least one hardware processor for executing processes of:

obtaining sensing data obtained by a sensing device attached to a mobile object sensing an observed characteristic of an observation target, when a request to provide the sensing data is received, outputting the sensing data that is based on this provision request to a user, and when a run operation change request to change a run operation of the mobile object is received, updating run operation information of the mobile object stored in a run operation information storage unit, according to the run operation change request.

LIST OF REFERENCE NUMERALS

1 Moving sensor apparatus
2 Fixed sensor apparatus
3 Application system
4 Network server
10 Sensing device
11 Control unit
11a Device information obtaining unit
11b Sensing data obtaining unit
11c Provision data catalogue generation unit
11d Sensing data output control unit
11e Provision data catalogue output control unit
11f Run operation information output control unit
11g Run operation information update unit
12 Sensing device connection unit
13 Operation unit
14 Communication unit
15 Attribute information storage database (attribute information storage DB)
16 Sensing data storage database (sensing data storage DB)
17 Provision data catalogue storage database (provision data catalogue storage DB)

18 Run operation information storage database (run operation information storage DB)
30 Mobile object
41 Matching unit
41a Fixed sensor determination unit
41b Moving sensor first determination unit
41c Moving sensor second determination unit
42 Data flow control unit
42a Run operation change request unit
43 Data catalogue registration unit
44 Communication unit
45 Provision data catalogue registration database (provision data catalogue registration DB)
46 Use data catalogue registration database (use data catalogue registration DB)
100 Moving sensor provision data catalogue
101 Fixed sensor provision data catalogue
102 Use data catalogue

The invention claimed is:

1. A moving sensor management apparatus that is configured to provide sensing data generated by a sensing device, including one or more sensors, attached to a mobile object, the moving sensor management apparatus comprising:
a communication unit;
a memory; and
a hardware processor coupled to the memory and the communication unit, the hardware processor configured to perform operations comprising:
storing run operation information of the mobile object in a run operation information storage, the run operation information being information indicating a travelling path on which the mobile object is scheduled to travel;
in response to a change request to change the run operation information is received from the communication unit, updating the run operation information stored in the run operation information storage, in accordance with the change request;
outputting, in response to a provision request to provide sensing data that is based on the run operation information, sensing data corresponding to the provision request;
when the run operation information is updated, outputting the updated run operation information to a run operation manager that manages the run operation information of the mobile object and running the mobile object according to the updated run operation information;
storing device attribute information indicating an attribute of the sensing device and mobile object attribute information indicating an attribute of the mobile object in an attribute information storage; and
outputting a provision data catalogue that indicates attributes of sensing data that can be provided to the user by the moving sensor management apparatus, and that is generated based on the run operation information of the mobile object, the device attribute information, and the mobile object attribute information,
wherein the device attribute information includes information indicating a sensor name, a sensor type, a resolution, and a detection accuracy, for each sensor of the sensing device.

2. The moving sensor management apparatus according to claim 1, wherein
the hardware processor is configured to perform operations further comprising: storing sensing data, such that outputting sensing data corresponding to the provision request further comprises
when the provision request is received, and sensing data corresponding to the provision request is stored in the sensing data storage, outputting the sensing data stored in the sensing data storage, and
when the provision request is received, and sensing data corresponding to the provision request is not stored in the sensing data storage, output sensing data after it is generated by the sensing device.

3. The moving sensor management apparatus according to claim 2,
wherein the hardware processor is configured to perform operations such that storing sensing data further comprises storing in the sensing data storage a position at which the sensing device generated the sensing data, a time when the sensing device generated the sensing data, and the sensing data generated by the sensing device, in association with each other.

4. A moving sensor apparatus comprising:
the moving sensor management apparatus according to claim 1; and
the sensing device attached to the mobile object.

5. A matching apparatus comprising a second hardware processor configured to perform operations comprising:
determining whether or not the moving sensor apparatus according to claim 4 can provide sensing data having an attribute requested by the user without changing the run operation information;
determining whether or not the moving sensor apparatus can provide sensing data having a requested attribute by changing the run operation information; and
outputting a change request to the moving sensor apparatus if it is determined that the moving sensor apparatus cannot provide sensing data having the requested attribute without changing the run operation information, and it is determined that the moving sensor apparatus can provide sensing data having the requested attribute by changing the run operation information.

6. The matching apparatus according to claim 5, wherein the second hardware processor is configured to perform operations further comprising
determining whether or not a fixed sensor apparatus provided with a sensing device fixed in a specific location can provide sensing data having the requested attribute, wherein the fixed sensor is configured to output sensing data corresponding to the provision request in response to the provision request, and
outputting the provision request to the fixed sensor apparatus regardless of results of determination of whether or not the moving sensor apparatus according to claim 4 can provide sensing data having the attribute requested by the user without changing the run operation information, and whether or not the moving sensor apparatus can provide sensing data having the requested attribute by changing the run operation information, if it is determined that sensing data having the requested attribute can be provided.

7. The matching apparatus according to claim 5, wherein the second hardware processor is configured to perform operations further comprising
determining whether or not a fixed sensor apparatus provided with a sensing device fixed in a specific location can provide sensing data having the requested attribute, wherein the fixed sensor is configured to output sensing data corresponding to the provision request in response to the provision request, and outputting the provision request to the moving sensor apparatus regardless of a result of a determination of whether or not a fixed sensor apparatus provided with the sensing device fixed in the specific location can provide sensing data having the requested attribute, if the change request is output to the moving sensor apparatus.

8. A sensing data distribution system comprising:
the moving sensor apparatus according to claim 4; and
the matching apparatus according to claim 5.

9. A data provision method for providing sensing data generated by a sensing device, including one or more sensors, attached to a mobile object, wherein a computer is configured to perform operations comprising:

storing, in a memory, run operation information of the mobile object, the run operation information being information indicating a travelling path on which the mobile object is scheduled to travel, when a request to change the run operation information is received from a communication unit, updating the stored run operation information in accordance with the change request, outputting, in response to a provision request to provide sensing data that is based on the run operation information, sensing data corresponding to the provision request;

when the run operation information is updated, outputting the updated run operation information to a run operation manager that manages the run operation information of the mobile object;

running the mobile object according to the updated run operation information;

storing device attribute information indicating an attribute of the sensing device and mobile object attribute information indicating an attribute of the mobile object; and outputting a provision data catalogue that indicates attributes of sensing data that can be provided to the user, and that is generated based on the run operation information of the mobile object, the device attribute information, and the mobile object attribute information, wherein the device attribute information includes information indicating a sensor name, a sensor type, a resolution, and a detection accuracy, for each sensor of the sensing device.

10. A non-transitory computer-readable medium storing a data provision program for causing a computer to execute processing for providing sensing data generated by a sensing device, including one or more sensors, attached to a mobile object, the program causing the computer to perform operations comprising:

storing run operation information of the mobile object, the run operation information being information indicating a travelling path on which the mobile object is scheduled to travel, when a request to change the run operation information is received from a communication unit, updating the stored run operation information, in accordance with the change request, outputting, in response to a provision request to provide sensing data that is based on the run operation information, sensing data corresponding to the provision request;

when the run operation information is updated, outputting the updated run operation information to a run operation manager that manages the run operation information of the mobile object;

running the mobile object according to the updated run operation information;

storing device attribute information indicating an attribute of the sensing device and mobile object attribute information indicating an attribute of the mobile object; and outputting a provision data catalogue that indicates attributes of sensing data that can be provided to the user, and that is generated based on the run operation information of the mobile object, the device attribute information, and the mobile object attribute information, wherein the device attribute information includes information indicating a sensor name, a sensor type, a resolution, and a detection accuracy, for each sensor of the sensing device.

11. A moving sensor apparatus comprising:
the moving sensor management apparatus according to claim 2; and
the sensing device attached to the mobile object.

12. A moving sensor apparatus comprising:
the moving sensor management apparatus according to claim 3; and
the sensing device attached to the mobile object.

* * * * *